United States Patent
Kuroda et al.

(10) Patent No.: US 8,135,429 B2
(45) Date of Patent: Mar. 13, 2012

(54) TRANSMISSION POWER CONTROL METHOD, BASE STATION, BASE STATION CONTROL STATION, AND CONTROL PROGRAM THEREOF

(75) Inventors: Nahoko Kuroda, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 596 days.

(21) Appl. No.: 12/293,232

(22) PCT Filed: Mar. 14, 2007

(86) PCT No.: PCT/JP2007/055077
§ 371 (c)(1),
(2), (4) Date: Sep. 16, 2008

(87) PCT Pub. No.: WO2007/111132
PCT Pub. Date: Oct. 4, 2007

(65) Prior Publication Data
US 2009/0209279 A1    Aug. 20, 2009

(30) Foreign Application Priority Data
Mar. 17, 2006  (JP) .................... 2006-075506

(51) Int. Cl.
*H04Q 7/20*  (2006.01)

(52) U.S. Cl. .... 455/522; 455/69; 455/127.1; 455/426.1; 455/426.2; 455/517; 370/310; 370/328; 370/329; 370/343; 370/345

(58) Field of Classification Search .................. 455/522, 455/69, 127.1, 57.11, 550.1, 445, 414.1–414.4, 455/426.1, 426.2, 500, 517, 508, 422.1, 403; 370/310, 328, 329, 343, 345
See application file for complete search history.

(56) References Cited

U.S. PATENT DOCUMENTS
2003/0128673 A1 *  7/2003  Lee et al. ................... 370/318
2009/0005107 A1 *  1/2009  Esmailzadeh et al. ........ 455/522

FOREIGN PATENT DOCUMENTS
| | | |
|---|---|---|
| JP | 2001-053790 A | 2/2001 |
| WO | 99/49609 A1 | 9/1999 |

OTHER PUBLICATIONS
3GPP TS25.214 v6.7.1 (Dec. 2005) 3rd Generation Partnership Project; Technical Specification Group Radio Access Network; Physical layer procedures (FDD)(release 6).
3GPP TS25.433 v6.8.0 (Dec. 2005) 3rd Generation Partnership Project; Technical Specification Group Radio Access Network; UTRAN Iub interface Node B Application Part (NBAP) signaling (release 6).
3GPP TR25.903 v0.3.0 (Feb. 2006) 3rd Generation Partnership Project; Technical Specification Group Radio Access Network; Continuous Connectivity for Packet Data Users;(release 7).

* cited by examiner

*Primary Examiner* — Keith Ferguson
(74) *Attorney, Agent, or Firm* — Sughrue Mion, PLLC

(57) ABSTRACT

In a transmission power control method for a base station in a communication system including at least a mobile station and at least one base station, the ratio of transmission power approaching a predetermined reference power is changed between a communication having a slot not transmitting a signal and a communication having no slot not transmitting a signal. Thus, in the transmission power control, it is possible to prevent the downstream transmission power from being too much alienated from a desired transmission power.

19 Claims, 13 Drawing Sheets

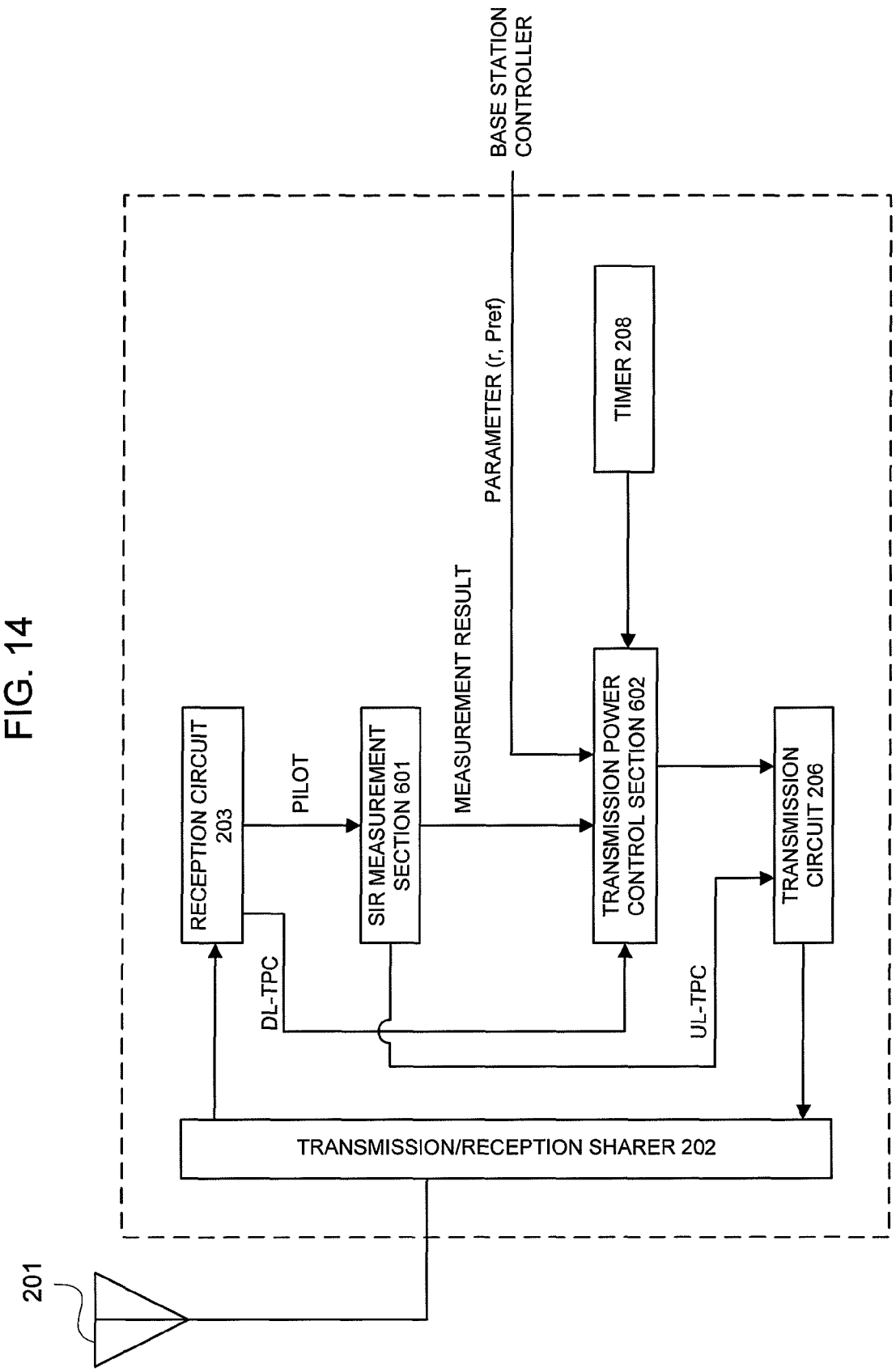

TRANSMISSION POWER CONTROL METHOD, BASE STATION, BASE STATION CONTROL STATION, AND CONTROL PROGRAM THEREOF

APPLICABLE FIELD IN THE INDUSTRY

The present invention relates to a transmission power control system, a transmission power control method, a base station, a base station controller, and a program thereof.

BACKGROUND ART

In a W-CDMA (Wide band-Code Division Multiple Access) system, which is a typical wireless communication system, HSDPA (High Speed Downlink Packet Access), which is a high-speed packet transmission system for a downlink, and EUDCH (Enhanced Uplink Dedicated Channel), which is a high-speed packet transmission system for a uplink, have been standardized. According to these packet transmission systems, a base station carries out scheduling, and only when data transmission/reception is performed, allocates wireless resources to a plurality of mobile stations according to time multiplexing or code multiplexing, resulting in the enhanced efficiency of use of the wireless resources. This W-CDMA system will be briefly explained by employing the accompanied drawings.

FIG. 1 is a schematic network configuration view illustrating one example of the W-CDMA system. Herein, a plurality of base stations 11 and 12 are connected to a base station controller 10, and the base station controller 10 can be further connected to an external network. Each of a plurality of the base stations can accommodate a plurality of mobile stations. Herein, it is assumed that mobile stations 21 and 22 are connecting to the base station 11, an mobile station 24 is connecting to the base station 12, and a mobile station 23 is in a soft handover (referred to as SHO where deemed appropriate) and therefore is connecting to both these base stations 11 and 12.

Each of the mobile stations 21 to 24 uses an uplink/downlink dedicated channel (DPCCH: Dedicated Physical Control Channel) for transmission/reception of a control signal to/from its corresponding base station. In addition hereto, the mobile stations 22 and 24 are performing data reception using the HSDPA, and the mobile stations 23 and 24 are performing data transmission using the EUDCH. The mobile stations 22 and 24, which are performing data reception by using the HSDPA, uses HS-SCCH (High Speed-Shared Control Channel) and HS-PDSCH (High Speed-Physical Downlink Shared Channel) for reception, and HS-DPCCH (High Speed-Dedicated Physical Control Channel) for transmission. Further, the mobile stations 23 and 24, which are performing data transmission by using the EUDCH, uses E-HICH (Enhanced-Hybrid ARQ Indicator Channel), E-AGCH (Enhanced-Absolute Grant Channel), and E-RGCH (Enhanced-Relative Grant Channel) for reception, and E-DPCCH (Enhanced-Dedicated Control Channel) and E-EDPCH (Enhanced-Dedicated Data Channel) for transmission. In other words, a mobile station as well, which is executing the HSDPA or the EUDCH, uses a channel called DPCCH for transmission and reception, apart from channels for data transmission and reception. The DPCCH is used to transmit a pilot signal, which is used for channel estimation in order for mobile station and base station to secure synchronization and to carry out demodulation, and a TPC (Transmission Power Control) signal, which is a control signal for a closed-loop power control.

A closed-loop power control is performed for the transmission power of the DPCCH so that the quality of the DPCCH becomes closer to a target quality (herein, a target SIR (Signal to Interference Ratio)). For example, in the transmission power control of the DPCCH for a uplink, the base station compares an actually received SIR of the DPCCH with the target SIR being decided by the base station controller 10, and when the reception SIR actually received is smaller than the target SIR, transmits a TPC signal instructing that the transmission power be increased through the DPCCH for a downlink. Otherwise, the base station transmits a TPC signal instructing that the transmission power be reduced. The mobile station increases or reduces the power for the DPCCH in accordance with the instruction of the TCP signal received through the DPCCH (Non-patent document 1).

Herein, in a case where the mobile station uses the DPCCH for transmission/reception to/from a plurality of the base stations, that is, where the mobile station is in a soft handover (SHO) state like the mobile station 23, the mobile station 23 receives a plurality of the TCP signals, and among the received TPC signals, if the mobile station receives at least one TCP signal giving an instruction to reduce the power, the mobile station is controlled to reduce its power. This is because during the SHO, communication can be carried out so long as any one of a plurality of the base stations meets a desired quality, and because increasing the transmission power to make a plurality of the base stations receive a sufficient quality leads to increased interference with another user, which is not favorable.

In this method, however, the base station having a minimum transmission loss occurring in a route to the mobile station can almost accurately receive a control signal being transmitted from the mobile station, whereas the base station having a large transmission loss occurring in a route to the mobile station more frequently fails in receiving a control signal being transmitted from the mobile station because the reception power of the control signal is small. Thus, an error in the transmission power control augments in the base station of which the transmission loss is large, which make it impossible to keep the downstream transmission powers of respective base stations equal to each other.

Thereupon, there has been proposed the transmission power control method called power balancing for enabling each base station to perform transmission with an almost identical power during an execution of the soft handover (Non-patent document 2).

Next, one example of the transmission power control for the downlink will be explained by making a reference to FIG. 2. FIG. 2 is a flowchart in which the base station decides the transmission power of the DPCCH for the downlink upon receipt of the TPC signal from the mobile station during an execution of the soft handover. Additionally, at the moment that a base station starts to perform the soft handover with a mobile station, a transmission power P is defined as a value of the last transmission power for its mobile station, namely remains unchanged if its base station is a serving base station that has performed transmission to its mobile station so far, and a transmission power P is defined as an initial value P0 if its base station is a Non-serving base station that has newly started transmission to its mobile station. Further, it is assumed that the controller notifies the number of the frame for starting the soft handover to the Serving base station and the Non-serving base station.

Further, in the following explanation, P(k) is a transmission power that is controlled in a slot k within an adjustment period, P_bal is an adjustment amount of a power balance per one slot within the adjustment period, P_bal(k) is an adjustment amount of the power balance in a k slot within the adjustment period, I is the number of frames, k is a number of the slot, and the frame is comprised of the predetermined number of the slots, and the following explanation is made on the assumption that the number of the slots within one frame is L. Additionally, 3GPP stipulates that the number of the slots within one frame is 15. In addition hereto, P_TPC(k) is an adjustment amount at the time of a k slot based upon the closed-loop power control, Tinit is an adjustment period, P_ref is a reference power offset value being decided by the base station controller, P_CPICH is a power value of a common pilot signal being transmitted by the base station, and r is an adjustment ratio of the power balancing.

At first, when a transmission power balance control message among a plurality of the base stations arrives from the control station, P_bal=0, I=0, and K=0 are reset as an initial value, respectively (step 101, step 102, and step 103). Herein, the mobile station notifies a TPC signal at a constant time period, and when this newly notified downstream control command has been received (step 104) and its TPC signal is a signal for giving an instruction for increasing the power (step 105), the transmission power increase/decrease amount P_TPC(k) in a k slot by the TPC signal is increased by the predetermined value ΔTPC (step 106), and when its TPC signal is a signal for giving an instruction for decreasing the power (step 105), P_TPC(k) is decreased by a predetermined value ΔTPC (step 107). On the other hand, when the TPC signal is not received, P_TPC(k) is defined as P_TPC(k)=0 (step 108), the operation proceeds to a step 109.

And, P_bal(k) is defined as P_bal(k)=P_bal (step 109), and the transmission power P(k) in a k slot is controlled so that an equation 1 holds (step 110).

$$P(k)=P(k-1)+P\_TPC(k)+P\_bal(k) \quad \text{Equation 1}$$

Additionally, when k=0, P(k−1) assumes the value of the final slot of the previous frame.

Continuously, k is incremented by 1 (step 111), and it is determined whether K has become L slot (step 112). If K is not L slot, the operation returns to the step 104, and the foregoing process is continued. On the other hand, when K becomes L slot, I is incremented by 1 (step 113). And, it is determined whether I=Tinit, that is, the adjustment period has expired (step 114).

When I=Tinit does not hold, the operation returns to the step 103, and the foregoing process is continued. On the other hand, when I=Tinit holds, a power P_init transmitted in the final slot of the adjustment period is assumed to be P(k−1) (step 115). And, so as to compute P_bal that is employed in the next adjustment period, a total amount of P_bal within the adjustment period is obtained from an equation 2 (step 116).

$$\text{Sum } P\_bal=(1-r)*(P\_ref+P\_CPICH-P\_init) \quad \text{Equation 2}$$

Continuously, the value obtained by multiplying Tinit by Lslot, that is, the value obtained by dividing SumP_bal by a total slot number in the adjustment period is assumed to be P_bal of the next adjustment period (step 117), the operation returns to the step 102, and the foregoing process is continued.

Such a power balancing is stipulated by the equation 1 and the equation 2, and is stipulated by 3GPP (3rd Generation Partnership Project) as well that stipulates a W-CDMA Standard (Non-patent document 1 and Non-patent document 2).

$$P(k)=P(k-1)+P\_TPC(k)+P\_bal(k) \quad \text{Equation 1}$$

$$\text{Sum } P\_bal=(1-r)*(P\_ref+P\_CPICH-P\_init) \quad \text{Equation 2}$$

However, 3GPP does not specifically stipulate the adjustment method within the adjustment period. That is, as described above, Sum Pbal may be equally divided for adjustment so that the transmission power is adjusted only by a constant value in each slot within the adjustment period in some cases, and may be divided in a lump or several times for adjustment only in a predetermined slot within the adjustment period in some cases.

By the way, in the foregoing 3GPP, there has been proposed the technology (which is called DPCCH Gating) of transmitting the control signal only in limited slots within the predetermined time period without performing continuous transmission of the control signal such as the TPC signal and the pilot signal in the DPCCH for the uplink in a case where the data transmission to the mobile station in question or the data transmission from the mobile station in question has not been performed in the HS-PDSCH and the E-DPDCH (Non-patent document 3). Herein, the so-called "no data transmission/reception to/from the mobile station" signifies that no transmission/reception of a signal has not bee performed between the mobile station in question and the base station over a predetermined time in at least one channel of the HS-PDSCH and the E-DPDCH. Such a situation occurs, for example, during the time (reading time) that a user of the mobile station, who is performing a Web perusal by using the HSDPA, is reading a downloaded Web page.

Upon explaining this technology by employing FIG. 3, the control signals such as the TPC signal and the pilot signal are continuously transmitted in a slot within the frame of the DPCCH when the data transmission is being performed. Such a situation is called a normal mode. On the other hand, when the data transmission is not performed, the control signals such as the TPC signal and the pilot signal are transmitted intermittently only in x slots (x<N) out of N slots of the DPCCH, or transmitted off and on, and are not transmitted in the slots other than these slots. Hereinafter, such a situation is called an intermittent transmission mode. Additionally, in FIG. 3, x slots in which the control signal is transmitted are listed on the assumption that they are continuous slots; however it is not always necessary that they are continuous.

Non-patent document 1: 3GPP TS25.214 v6.7.1 (2005-12) 3rd Generation Partnership Project; Technical Specification Group Radio Access Network; Physical layer procedures (FDD)(release 6)

Non-patent document 2: 3GPP TS25.433 v6.8.0 (2005-12) 3rd Generation Partnership Project; Technical Specification Group Radio Access Network; UTRAN Iub interface Node B Application Part (NBAP) signaling (release 6)

Non-patent document 3: 3GPP TR25.903 v0.3.0 (2006-02) 3rd Generation Partnership Project; Technical Specification Group Radio Access Network; Continuous Connectivity for Packet Data Users; (release 7)

DISCLOSURE OF THE INVENTION

Problems to be Solved by the Invention

By the way, in the DPCCH Gating in which the normal mode and the intermittent transmission mode exist, with the intermittent transmission mode, the TPC signal as well that the mobile station transmits to the base station in the DPCCH for the uplink is transmitted only in one part of the slots (x slots out of N slots). Thus, it follows that an increase/decrease in the transmission power by the TCP signal in the closed-loop transmission power control is reflected into the N slots only x times. At this time, when the power balancing has been initiated, the initiated power balancing causes a problem that the downstream transmission power becomes too close to a reference power (P_ref+P_CPICH) of the power balancing, and resultantly becomes a low transmission power such that the target SIR of the downstream DPCCH is not satisfied in some cases and becomes a high transmission power such that the quality of the downstream DPCCH becomes excessive in some cases.

FIG. 4 is a view illustrating a change in the downstream transmission power in the case that after the mobile station transits to the intermittent transmission mode from the normal mode and the state that no transmission of TPC signal using the DPCCH continues, the mobile station transits to the normal mode again. Herein, it is assumed that, for example, an adjustment cycle of the power balancing is one frame (15 slots), an adjustment ratio r is 0.5, an intermittent transmission cycle N in the intermittent transmission mode is 45 slots, and the number of the transmission slots is three.

As shown in FIG. 4, the adjustment of the transmission power based upon the closed-loop power control by the TPC signal is executed slot by slot and the transmission power is controlled so as to approach such a transmission power that can satisfy the target SIR because the TPC signal as well is transmitted slot by slot in the normal mode. However, upon transiting to the intermittent transmission mode, the adjustment amount based upon the closed-loop power control by the TPC signal is not reflected into the power in the slot in which the control signal is not transmitted by using the DPCCH. For this, the downstream transmission power decreases by a portion of P_bal slot by slot in a case where the adjustment amount P_bal of the power balance is in a direction in which the power is reduced.

In such a case, resultantly, the quality of the downstream DPCCH cannot meet the target SIR, so an error ratio of the control signal etc. being transmitted in the downstream DPCCH augments. An increase in an error ratio of the control signal in the downstream DPCCH causes the transmission power control for the uplink not to be correctly performed because the TPC signal for controlling the transmission power of the upstream DPCCH is included in the control signal for the downlink. As a rule, the uplink channels (the E-DPCCH, the E-DPDCH, etc.) other than the DPCCH have the transmission power of the upstream DPCCH as a reference, and the transmission power thereof is controlled by adding a predetermined power offset for the reference. Thus, when the power control of the upstream DPCCH is not correctly performed, a possibility that the other uplink channels as well deteriorate is high, which causes a problem.

Thereupon, the present invention has been accomplished in consideration of the above-mentioned problems, and an object thereof is to provide a technology of, in the power control of the transmission power, preventing the transmission power from being too much alienated from a desired transmission power.

Means to Solve the Problem

The 1st invention for solving the above-mentioned problems, which is a transmission power control method of a base station in a communication system including at least a mobile station and at least one base station, characterized in changing a ratio of a transmission power approaching a predetermined reference power between a communication having a slot for not transmitting a signal and a communication having no slot for not transmitting a signal.

The 2nd invention for solving the above-mentioned problems, in the above-mentioned 1st invention, is characterized in that: said transmission power control method is a transmission power control method including power balancing for updating the transmission power of the base station having established a channel with said mobile station based upon a predetermined reference power; and said predetermined reference power is comprised of a reference power offset value being decided by a base station controller, and a power value of a common pilot signal being transmitted by the base station.

The 3rd invention for solving the above-mentioned problems, in the above-mentioned 1st or 2nd inventions, is characterized in making a ratio of approaching said predetermined reference power in a communication having a slot for stopping a transmission of the signal lower than a ratio of approaching said predetermined reference power in a communication having no slot for stopping a transmission of the signal.

The 4th invention for solving the above-mentioned problems, in one of the above-mentioned 1st to 3rd inventions, is characterized in that: said communication having a slot for stopping a transmission of the signal is a communication in the case that the mobile station is intermittently transmitting a control signal; and said communication having no slot for stopping a transmission of the signal is a communication in the case that the mobile station is consecutively transmitting a control signal.

The 5th invention for solving the above-mentioned problems, which is a transmission power control method in a communication means for performing a power control for a downlink, characterized in, when it is assumed that P(k−1) is a transmission power at the time of a (k−1) slot, P_TPC(k) is a power adjustment value at the time of a k slot based upon a closed-loop power control, R_gating is a variable, and P_bal (k) is an adjustment amount of a power balance in a slot k within an adjustment period, controlling a transmission power P(k) at the time of a k slot in the adjustment period of the transmission power for the downlink based upon Equation $P(k)=P(k-1)+P\_TPC(k)+R\_gating*P\_bal(k)$.

The 6th invention for solving the above-mentioned problems, in the above-mentioned 5th invention, is a transmission power control method according to claim 5, characterized in that when it is determined that a mobile station is in an intermittent transmission mode for intermittently transmitting a control signal, said R_gating is a value less than 1.

The 7th invention for solving the above-mentioned problems, which is a transmission power control method of, when it is assumed that, in a certain adjustment period, P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is a variable, P_ref is a reference power, P_P-CPICH is a power of a common pilot signal, and P_init is a transmission power in a final slot of the adjustment period of the previous power balance, controlling a transmission power P(k) at the time of a k slot in the adjustment period of the transmission power for a downlink based upon $P(k)=P(k-1)+P\_TPC(k)+P\_bal(k)$ and Sum $P\_bal(k)=(1-r)*(P\_ref+P\_P\text{-}CPICH-P\_init)$, characterized in, when it is determined that a mobile station is in an intermittent transmission mode for intermittently transmitting a control signal, employing r_gating, being a variable different from said r, thereby to control the transmission power P(k) at the time of a k slot in the adjustment period of the transmission power based upon $$P(k)=P(k-1)+P\_TPC(k)+P\_bal(k) \text{ and}$$

$$\text{Sum } P\_bal(k)=(1-r\_gating)*(P\_ref+P\_P\text{-CPICH}-P\_init).$$

The 8th invention for solving the above-mentioned problems, which is a transmission power control method in a communication means for performing a power control for a downlink, characterized in, when it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is an adjustment ratio, f_gating is a constant, P_ref is a reference power, P_P-CPICH is a power of a common pilot signal, and P_init is a transmission power at the time of an adjustment period start, controlling a transmission power P(k) at the time of a k slot in the adjustment period of the transmission power for the downlink based upon $$P(k)=P(k-1)+P\_TPC(k)+P\_bal(k) \text{ and}$$

$$\text{Sum } P\_bal(k)=f\_gating*(1-r)*(P\_ref+P\_P\text{-CPICH}-P\_init).$$

The 9th invention for solving the above-mentioned problems, which is a transmission power control method in a communication means for performing a power control for a downlink, characterized in, when it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is an adjustment ratio, f_gating is a value that is decided based upon a ratio of the number of slots in which a control signal is transmitted from a mobile station within the adjustment period, P_ref is a reference power, P_P-CPICH is a power of a common pilot signal, and P_init is a transmission power in a final slot of the adjustment period of the previous power balance, controlling a transmission power P(k) at the time of a k slot in the adjustment period of the transmission power for the downlink based upon $$P(k)=P(k-1)+P\_TPC(k)+P\_bal(k) \text{ and}$$

$$\text{Sum } P\_bal(k)=f\_gating*(1-r)*(P\_ref+P\_P\text{-CPICH}-P\_init).$$

The 10th invention for solving the above-mentioned problems, in one of the above-mentioned 8th or 9th inventions, is characterized in that when it is determined that a mobile station is in an intermittent transmission mode for intermittently transmitting the control signal, said f_gating is a value less than 1.

The 11th invention for solving the above-mentioned problems, in one of the above-mentioned 5th to 11th inventions, is characterized in, when it has been determined in a midst of the adjustment period that the mobile station is in the intermittent transmission mode, performing the power control of current power balancing during said adjustment period, and performing the power control of power balancing of said intermittent transmission mode in and since an adjustment period next to said adjustment period.

The 12th invention for solving the above-mentioned problems, in one of the above-mentioned 5th to 11th inventions, is characterized in, when it has been determined in a midst of the adjustment period that the mobile station is in the intermittent transmission mode, not performing the power control for the downlink during said adjustment period, and performing the power control of said intermittent transmission mode in and since an adjustment period next to said adjustment period.

The 13th invention for solving the above-mentioned problems, in one of the above-mentioned 5th to 11th inventions, is characterized in, when it has been determined in a midst of the adjustment period that the mobile station is in the intermittent transmission mode, changing the adjustment amount of the power balance responding to a ratio of a remaining time of said balance adjustment period during said adjustment period.

The 14th invention for solving the above-mentioned problems, which is a transmission power control method in a communication means for performing a power control, characterized in, based upon a reception state of a signal associated with the power control, executing or stopping a control of a transmission power.

The 15th invention for solving the above-mentioned problems, which is a transmission power control method in a communication means for performing a power control, characterized in, based upon a reception state of a signal associated with the power control, employing any of two different transmission power control methods.

The 16th invention for solving the above-mentioned problems, which is a transmission power control method in such a system for performing a balance adjustment of transmission powers of a plurality of base stations, characterized in including two adjustment methods, i.e. a first balance adjustment method in the case of having a slot in which a control signal for the base station is not transmitted, and a second balance adjustment method in the case of having no slot in which a control signal is not transmitted.

The 17th invention for solving the above-mentioned problems, which is a communication system including at least a mobile station and at least one base station, characterized in comprising a transmission power controlling means for changing a ratio of a transmission power approaching a predetermined reference power between a communication having a slot for not transmitting a signal and a communication having no slot for not transmitting a signal.

The 18th invention for solving the above-mentioned problems, in the above-mentioned 17th invention, is characterized in that: said transmission power controlling means performs power balancing for updating the transmission power of the base station having established a channel with said mobile station based upon a predetermined reference power; and said predetermined reference power is comprised of a reference power offset value being decided by a base station controller, and a power value of a common pilot signal being transmitted by the base station.

The 19th invention for solving the above-mentioned problems, in the above-mentioned 17th or 18th inventions, is characterized in that said transmission power controlling means makes a ratio of approaching said predetermined reference power in a communication having a slot for stopping a transmission of the signal lower than a ratio of approaching said predetermined reference power in a communication having no slot for stopping a transmission of the signal.

The 20th invention for solving the above-mentioned problems, in one of the above-mentioned 17th to 19th inventions, is characterized in that: said communication having a slot for stopping a transmission of the signal is a communication in the case that the mobile station is intermittently transmitting a control signal; and said communication having no slot for stopping a transmission of the signal is a communication in the case that the mobile station is consecutively transmitting a control signal.

The 21st invention for solving the above-mentioned problems, which is a communication system for performing a power control for a downlink, characterized in comprising a transmission power controlling means for, when it is assumed that P(k−1) is a transmission power at the time of a (k−1) slot, P_TPC(k) is a power adjustment value at the time of a k slot based upon a closed-loop power control, R_gating is a variable, and P_bal(k) is an adjustment amount of a power balance in a slot k within an adjustment period, controlling a transmission power P(k) at the time of a k slot in the adjustment period of the transmission power for the downlink based upon Equation $P(k)=P(k-1)+P\_TPC(k)+R\_gating*P\_bal(k)$.

The 22nd invention for solving the above-mentioned problems, in the above-mentioned 21st invention, is characterized in that when it is determined that a mobile station is in an intermittent transmission mode for intermittently transmitting a control signal, said R_gating is a value less than 1.

The 23rd invention for solving the above-mentioned problems, which is a communication system for, when in a case where it is determined in a certain adjustment period that a mobile station is in a normal mode for consecutively transmitting a control signal, it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is a variable, P_ref is a reference power, P_P-CPICH is a power of a common pilot signal, and P_init is a transmission power in a final slot in the adjustment period of the previous power balance, controlling a transmission power P(k) at the time of a k slot in the adjustment period of the transmission power for a downlink based upon $P(k)=P(k-1)+P\_TPC(k)+P\_bal(k)$ and Sum $P\_bal(k)=(1-r)*(P\_ref+P\_P\text{-CPICH}-P\_init)$, characterized in comprising a transmission power controlling means for, when it is determined that the mobile station is in an intermittent transmission mode for intermittently transmitting the control signal, employing r_gating, being a variable different from said r, thereby to control the transmission power P(k) at the time of a k slot in the adjustment period of the transmission power based upon $P(k)=P(k-1)+P\_TPC(k)+P\_bal(k)$ and Sum $P\_bal(k)=(1-r\_gating)*(P\_ref+P\_P\text{-CPICH}-P\_init)$.

The 24th invention for solving the above-mentioned problems, which is a communication system for performing a power control for a downlink, characterized in comprising a transmission power controlling means for, when it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is an adjustment ratio, f_gating is a constant, P_ref is a reference power, P_P-CPICH is a power of a common pilot signal, and P_init is a transmission power at the time of an adjustment period start, controlling a transmission power P(k) at the time of a k slot in the adjustment period of the transmission power for the downlink based upon $P(k)=P(k-1)+P\_TPC(k)+P\_bal(k)$ and Sum $P\_bal(k)=f\_gating*(1-r)*(P\_ref+P\_P\text{-CPICH}-P\_init)$.

The 25th invention for solving the above-mentioned problems, which is a communication system for performing a power control for a downlink, characterized in including a transmission power controlling means for, when it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is an adjustment ratio, f_gating is a value that is decided based upon a ratio of the number of slots in which a control signal is transmitted from a mobile station within the adjustment period, P_ref is a reference power, P_P-CPICH is a power of a common pilot signal, and P_init is a transmission power in a final slot in the adjustment period of the previous power balance, controlling a transmission power P(k) at the time of a k slot in the adjustment period of the transmission power for the downlink based upon $P(k)=P(k-1)+P\_TPC(k)+P\_bal(k)$ and Sum $P\_bal(k)=f\_gating*(1-r)*(P\_ref+P\_P\text{-CPICH}-P\_init)$.

The 26th invention for solving the above-mentioned problems, in the above-mentioned 24th or 25th inventions, is characterized in that when it is determined that a mobile station is in an intermittent transmission mode for intermittently transmitting a control signal, said f_gating is a value less than 1.

The 27th invention for solving the above-mentioned problems, in one of the above-mentioned 21st to 26th inventions, is characterized in that said transmission power controlling means, when it has been determined in a midst of the adjustment period that the mobile station is in the intermittent transmission mode, performs the power control of current power balancing during said adjustment period, and performs the power control of power balancing of said intermittent transmission mode in and since an adjustment period next to said adjustment period.

The 28th invention for solving the above-mentioned problems, in one of the above-mentioned 21st to 26th inventions, is characterized in that said transmission power controlling means, when it has been determined in a midst of the adjustment period that the mobile station is in the intermittent transmission mode, does not perform the power control for the downlink during said adjustment period, and performs the power control of said intermittent transmission mode in and since an adjustment period next to said adjustment period.

The 29th invention for solving the above-mentioned problems, in one of the above-mentioned 21st to 26th inventions, is characterized in that said transmission power controlling means, when it has been determined in a midst of the adjustment period that the mobile station is in the intermittent transmission mode, changes the adjustment amount of the power balance responding to a ratio of a remaining time of said balance adjustment period during said adjustment period.

The 30th invention for solving the above-mentioned problems, which is a communication system for performing a power control of power balancing, characterized in comprising a means for, based upon a reception state of a signal associated with the power control, executing or stopping a transmission power control.

The 31st invention for solving the above-mentioned problems, which is a communication system for performing a power control of power balancing, characterized in comprising a means for, based upon a reception state of a signal associated with the power control, employing any of different transmission power controls, thereby to perform a transmission power control.

The 32nd invention for solving the above-mentioned problems, which is a communication system for performing a balance adjustment of transmission powers of a plurality of base stations, characterized in comprising a means for performing the balance adjustment of the transmission power by employing any of two adjustment methods, i.e. a first balance adjustment method in the case of having a slot in which a control signal for the base station is not transmitted, and a second balance adjustment method in the case of having no slot in which a control signal is not transmitted.

The 33rd invention for solving the above-mentioned problems, which is a base station in a communication system including at least a mobile station and at least one base station, characterized in comprising a transmission power controlling means for changing a ratio of a transmission power approaching a predetermined reference power between a communication having a slot for not transmitting a signal and a communication having no slot for not transmitting a signal.

The 34th invention for solving the above-mentioned problems, in the above-mentioned 33rd invention, is characterized in that: said transmission power controlling means performs power balancing for updating the transmission power of the base station having established a channel with said mobile station based upon a predetermined reference power; and said predetermined reference power is comprised of a reference power offset value being decided by a base station controller, and a power value of a common pilot signal being transmitted by the base station.

The 35th invention for solving the above-mentioned problems, in above-mentioned 33rd or 34th inventions, is characterized in that said transmission power controlling means makes a ratio of approaching said predetermined reference power in a communication having a slot for stopping a transmission of the signal lower than a ratio of approaching said predetermined reference power in a communication having no slot for stopping a transmission of the signal.

The 36th invention for solving the above-mentioned problems, in one of the above-mentioned 33rd to 35th inventions, is characterized in that: said communication having a slot for stopping a transmission of the signal is a communication in the case that the mobile station is intermittently transmitting a control signal; and said communication having no slot for stopping a transmission of the signal is a communication in the case that the mobile station is consecutively transmitting a control signal.

The 33rd invention for solving the above-mentioned problems, which is a base station in a communication system for performing a power control for a downlink, characterized in comprising a transmission power controlling means for, when it is assumed that P(k−1) is a transmission power at the time of a (k−1) slot, P_TPC(k) is a power adjustment value at the time of a k slot based upon a closed-loop power control, R_gating is a variable, and P_bal(k) is an adjustment amount of a power balance in a slot k within an adjustment period, controlling a transmission power P(k) at the time of a k slot in the adjustment period of the transmission power for the downlink based upon Equation $P(k)=P(k-1)+P\_TPC(k)+R\_gating*P\_bal(k)$.

The 38th invention for solving the above-mentioned problems, in the above-mentioned 37th invention, is characterized in that when it is determined that a mobile station is in an intermittent transmission mode for intermittently transmitting a control signal, said R_gating is a value less than 1.

The 39th invention for solving the above-mentioned problems, which is a base station for, when in a case where it is determined in a certain adjustment period that a mobile station is in a normal state for consecutively transmitting a control signal, it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is a variable, P_ref is a reference power, P_P-CPICH is a power of a common pilot signal, and P_init is a transmission power in a final slot in the adjustment period of the previous power balance, controlling a transmission power P(k) at the time of a k slot in the adjustment period of the transmission power for a downlink based upon $P(k)=P(k-1)+P\_TPC(k)+P\_bal(k)$ and Sum $P\_bal(k)=(1-r)*(P\_ref+P\_P\text{-CPICH}-P\_init)$, characterized in comprising a transmission power controlling means for, when it is determined that the mobile station is in an intermittent transmission mode for intermittently transmitting a control signal, employing r_gating, being a variable different from said r, thereby to control the transmission power P(k) at the time of a k slot in the adjustment period of the transmission power based upon $P(k)=P(k-1)+P\_TPC(k)+P\_bal(k)$ and Sum $P\_bal(k)=(1-r\_gating)*(P\_ref+P\_P\text{-CPICH}-P\_init)$.

The 40th invention for solving the above-mentioned problems, which is a base station in a communication system for performing a power control for a downlink, characterized in comprising a transmission power controlling means for, when it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is an adjustment ratio, f_gating is constant, P_ref is a reference power, P_P-CPICH is a power of a common pilot signal, and P_init is a transmission power at the time of an adjustment period start, controlling a transmission power P(k) at the time of a k slot in the adjustment period of the transmission power for the downlink based upon $P(k)=P(k-1)+P\_TPC(k)+P\_bal(k)$ and Sum $P\_bal(k)=f\_gating*(1-r)*(P\_ref+P\_P\text{-CPICH}-P\_init)$.

The 41st invention for solving the above-mentioned problems, which is a base station in a communication system for performing a power control for a downlink, characterized in including a transmission power controlling means for, when it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is an adjustment ratio, f_gating is a value that is decided based upon a ratio of the number of slots in which a control signal is transmitted from a mobile station within the adjustment period, P_ref is a reference power, P_P-CPICH is a power of a common pilot signal, and P_init is a transmission power in a final slot in the adjustment period of the previous power balance, controlling a transmission power P(k) at the time of a k slot in the adjustment period of the transmission power for the downlink based upon $$P(k)=P(k-1)+P\_TPC(k)+P\_bal(k) \text{ and}$$

$$\text{Sum } P\_bal(k)=f\_gating*(1-r)*(P\_ref+P\_P\text{-CPICH}-P\_init).$$

The 42nd invention for solving the above-mentioned problems, in the above-mentioned 40th or 41st inventions, is characterized in that when it is determined that a mobile station is in an intermittent transmission mode for intermittently transmitting a control signal, said f_gating is a value less than 1.

The 43rd invention for solving the above-mentioned problems, in one of the above-mentioned 37th to 42nd inventions, is characterized in that said transmission power controlling means, when it has been determined in a midst of the adjustment period that the mobile station is in the intermittent transmission mode, performs the power control of current power balancing during said adjustment period, and performs the power control of power balancing of said intermittent transmission mode in and since an adjustment period next to said adjustment period.

The 44th invention for solving the above-mentioned problems, in one of the above-mentioned 37th to 43rd inventions, is characterized in that said transmission power controlling means, when it has been determined in a midst of the adjustment period that the mobile station is in the intermittent transmission mode, does not perform the power control for the downlink during said adjustment period, and performs the power control of said intermittent transmission mode in and since an adjustment period next to said adjustment period.

The 45th invention for solving the above-mentioned problems, in one of the above-mentioned 37th to 43rd inventions, is characterized in that said transmission power controlling means, when it has been determined in a midst of the adjustment period that the mobile station is in the intermittent transmission mode, changes the adjustment amount of the power balance responding to a ratio of a remaining time of said balance adjustment period.

The 46th invention for solving the above-mentioned problems, which is a base station for performing a power control of power balancing, characterized in comprising a means for, based upon a reception state of a signal associated with the power control, executing or stopping a transmission power control.

The 47th invention for solving the above-mentioned problems, which is a base station in a communication system for performing a power control of power balancing, characterized in comprising a means for, based upon a reception state of a signal associated with the power control, employing any of different transmission power controls, thereby to perform a transmission power control.

The 48th invention for solving the above-mentioned problems, which is a base station in a communication system for performing a balance adjustment of transmission powers of a plurality of base stations, characterized in comprising a means for performing the balance adjustment of the transmission power by employing any of two adjustment methods, i.e. a first balance adjustment method in the case of having a slot in which a control signal for the base station is not transmitted, and a second balance adjustment method in the case of having no slot in which a control signal is not transmitted.

The 49th invention for solving the above-mentioned problems, which is a base station controller in a communication system including at least a mobile station and at least one base station, characterized in comprising a means for transmitting a parameter of a transmission power control in a communication having a slot for not transmitting a signal, and a parameter of a transmission power control in a communication having no slot for not transmitting a signal to the base station.

The 50th invention for solving the above-mentioned problems, which is a base station controller in a communication system including at least a mobile station and at least one base station, characterized in comprising a means for transmitting any of a parameter of a transmission power control in a communication having a slot for not transmitting a signal, and a parameter of a transmission power control in a communication having no slot for not transmitting a signal to the base station.

The 51st invention for solving the above-mentioned problems, which is a program for a base station in a communication system including at least a mobile station and at least one base station, characterized in causing said base station to execute a process of changing a ratio of a transmission power approaching a predetermined reference power between a communication having a slot for not transmitting a signal and a communication having no slot for not transmitting a signal.

The 52nd invention for solving the above-mentioned problems, which is a program for a base station in a communication system for performing a power control for a downlink, characterized in causing said base station to execute a process of, when it is assumed that P(k−1) is a transmission power at the time of a (k−1) slot, P_TPC(k) is a power adjustment value at the time of a k slot based upon a closed-loop power control, R_gating is a variable, and P_bal(k) is an adjustment amount of a power balance in a slot k within an adjustment period, controlling a transmission power P(k) at the time of a k slot in the adjustment period of the transmission power for the downlink based upon $$\text{Equation } P(k)=P(k-1)+P\_TPC(k)+R\_gating*P\_bal(k).$$

The 53rd invention for solving the above-mentioned problems, which is a program for a base station for, when in a case where it is determined in a certain adjustment period that a mobile station is in a normal mode for consecutively transmitting a control signal, it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is a variable, P_ref is a reference power, P_P-CPICH is a power of a common pilot signal, and P_init is a transmission power in a final slot in the adjustment period of the previous power balance, controlling a transmission power P(k) at the time of a k slot in the adjustment period of the transmission power for a downlink based upon $$P(k)=P(k-1)+P\_TPC(k)+P\_bal(k) \text{ and}$$

$$\text{Sum } P\_bal(k)=(1-r)*(P\_ref+P\_P\text{-CPICH}-P\_init),$$

characterized in causing said base station to execute a process of, when it is determined that the mobile station is in an intermittent transmission mode for intermittently transmitting a control signal, employing r_gating, being a variable different from said r, thereby to control the transmission power P(k) at the time of a k slot in the adjustment period of the transmission power based upon $$P(k)=P(k-1)+P\_TPC(k)+P\_bal(k) \text{ and}$$

$$\text{Sum } P\_bal(k)=(1-r\_gating)*(P\_ref+P\_P\text{-CPICH}-P\_init).$$

The 54th invention for solving the above-mentioned problems, which is a program for a base station in a communication system for performing a power control for a downlink, characterized in causing said base station to execute a process of, when it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is an adjustment ratio, f_gating is a constant, P_ref is a reference power, P_P-CPICH is a power of a common pilot signal, and P_init is a transmission power at the time of an adjustment period start, controlling a transmission power P(k) at the time of a k slot in the adjustment period of the transmission power for the downlink based upon $$P(k)=P(k-1)+P\_TPC(k)+P\_bal(k) \text{ and}$$

$$\text{Sum } P\_bal(k)=f\_gating*(1-r)*(P\_ref+P\_P\text{-CPICH}-P\_init).$$

The 55th invention for solving the above-mentioned problems, which is a program for a base station in a communication system for performing a power control for a downlink, characterized in causing said base station to execute a process of, when it is assumed that P(k−1) is a transmission power at the time of a (k−1) slot, P_TPC(k) is a power adjustment value at the time of a k slot based upon a closed-loop power control, P_bal(k) is an adjustment amount of a power balance in a slot k within an adjustment period, r is an adjustment ratio, f_gating is a value that is decided based upon a ratio of the number of slots in which a control signal is transmitted from a mobile station within the adjustment period, P_ref is a reference power, P_P-CPICH is a power of a common pilot signal, and P_init is a transmission power in a final slot in the adjustment period of the previous power balance, controlling a transmission power P(k) at the time of a k slot in the adjustment period of the transmission power for the downlink based upon $$P(k)=P(k-1)+P\_TPC(k)+P\_bal(k) \text{ and}$$

$$\text{Sum } P\_bal(k)=f\_gating*(1-r)*(P\_ref+P\_P\text{-CPICH}-P\_init).$$

The 56th invention for solving the above-mentioned problems, which is a program for a base station for performing a power control of power balancing, characterized in causing said base station to execute a process of, based upon a reception state of a signal associated with the power control, executing or stopping a transmission power control.

The 57th invention for solving the above-mentioned problems, which is a program for a base station in a communication system for performing a power control of power balancing, characterized in causing said base station to execute a process of, based upon a reception state of a signal associated with the power control, employing any of two different transmission power controls, thereby to perform a transmission power control.

The 58th invention for solving the above-mentioned problems, which is a program for a base station in a communication system for performing a balance adjustment of transmission powers of a plurality of the base stations, characterized in causing said base station to execute a process of performing the balance adjustment of the transmission power by employing any of two adjustment methods, i.e. a first balance adjustment method in the case of having a slot in which a control signal for the base station is not transmitted, and a second balance adjustment method in the case of having no slot in which a control signal is not transmitted.

An Advantageous Effect of the Invention

With the present invention, in the power control of the transmission power, the downstream transmission power can be prevented from being too much alienated from a desired transmission power.

BRIEF DESCRIPTION OF THE DRAWINGS

FIG. 14 is a view illustrating a configuration of a base station of an example 6.

Figure 1:
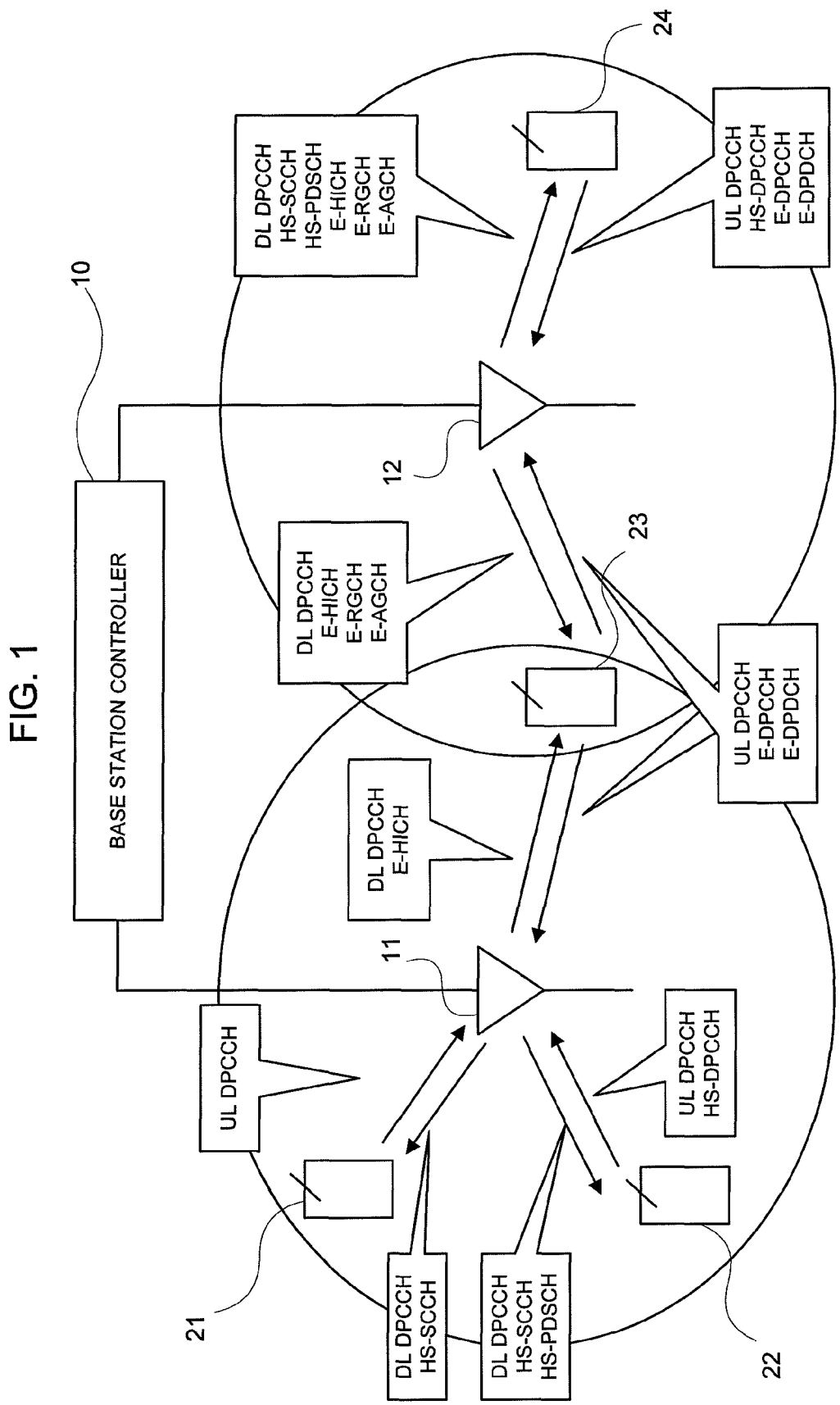
FIG. 1 is a schematic network configuration view illustrating one example of the W-CDMA system.

DESCRIPTION OF NUMERALS 1 base station controller
2 and 3 base stations
4 mobile station
101 storage section
102 control section
201 antenna
202 transmission/reception sharer
203 reception circuit
204 SIR measurement section
205 transmission power control section
206 transmission circuit
207 state management section
208 timer
401 antenna
402 transmission/reception sharer
403 reception circuit
404 SIR measurement section
405 transmission power control section
406 transmission circuit
407 pilot signal power measurement section
408 state management section
501 storage section
502 application determination section 503 control section
601 SIR measurement section
602 transmission power control section

BEST MODE FOR CARRYING OUT THE INVENTION

An embodiment of the present invention will be explained.

The present invention, which performs the power control of the power balancing in the downlink, is characterized in changing a ratio of the transmission power approaching a reference power of the power balancing between a communication in which the signal is transmitted in all slots like the case of the normal mode, and a communication having the slot for not transmitting the signal like the case of the intermittent transmission mode.

As a method of changing a ratio of the transmission power for the downlink approaching a reference power of the power balancing, there exist the followings.

1. A parameter of the power balancing different from that of the normal mode is applied at the time of the intermittent transmission mode.

Applying the parameter of the power balancing different from that of the normal mode at the time of the intermittent transmission mode makes the adjustment amount of the power balancing changeable. In particular, setting the parameter so that the adjustment amount of the power balancing is lowered enables the transmission power to be prevented from converting to the reference power of the power balancing. Specifically, the following methods exist.

(1) The ratio at which the adjustment amount of the power balancing is reflected is lowered.

The power control of the downlink in the normal mode is shown by an equation 1.

$$P(k)=P(k-1)+P\_TPC(k)+P\_bal(k) \qquad \text{Equation 1}$$

Where $P(k)$ is a transmission power at the time of a k slot, $P(k-1)$ is a transmission power at the time of a $(k-1)$ slot, $P\_TPC(k)$ is an adjustment amount at the time of a k slot based upon the closed-loop power control, and $P\_bal(k)$, which is an adjustment amount of the power balancing in a slot k within the adjustment period, is stipulated by an equation 2.

$$\text{Sum } P\_bal=(1-r)*(P\_ref+P\_CPICH-P\_init) \qquad \text{Equation 2}$$

Where $P\_ref$ is a reference power offset value being decided by the base station controller, $P\_CPICH$ is a power value of a common pilot signal being transmitted by the base station, and $P\_init$ is a transmission power of the downstream DPCCH in the final slot of the adjustment period of the previous power balancing.

On the other hand, at the time of the intermittent transmission mode, $P\_bal(k)$ is multiplied by a parameter $R\_gating$ for changing the adjustment amount that is used at the intermittent transmission mode, thereby controlling the adjustment amount of the power balancing. Specifically, with the power transmission $P(k)$ at the time of a k slot, the following equation 3 holds.

$$P(k)=P(k-1)+P\_TPC(k)+R\_gating*P\_bal(k) \qquad \text{Equation 3}$$

Where $R\_gating$, which is a parameter that the base station controller decides and notifies to the base station, is a value equal to or less than 1, and assuming the value less than 1 makes it possible to lower the adjustment amount of the power balancing as compared with the adjustment amount at the time of the normal mode, and the power balancing stops when $R\_gating=0$.

The foregoing was shown on the assumption that the transmission power was controlled by employing the equation 1 in the normal mode and the transmission power was controlled by employing the equation 3 in the intermittent transmission mode, namely, the different transmission power controls were separately used; however $R\_gating$ may be defined as $R\_gating=1$ at the time of the normal mode, and may be defined as $R\_gating$ being less than 1 at the time of the intermittent transmission mode because the transmission power control employing the equation 3 has been performed.

Further, herein, it was assumed that the base station controller decided $R\_gating$, and notified it to the base station; however the present invention is not limited to it, and the base station may decide the value smaller than 1 at random, or based upon a ratio of the number of the slots in which the control signal is transmitted during the intermittent transmission mode.

(2) An adjustment ratio of the power balancing different from that of the power balancing at the normal mode is employed, thereby lowering the adjustment amount of the power balancing.

The power control of the downlink in the normal mode is shown by an equation 1.

$$P(k)=P(k-1)+P\_TPC(k)+P\_bal(k) \qquad \text{Equation 1}$$

Where $P(k)$ is a transmission power at the time of a k slot, $P(k-1)$ is a transmission power at the time of a $(k-1)$ slot, $P\_TPC(k)$ is an adjustment amount at the time of a k slot based upon the closed-loop power control, and $P\_bal(k)$, which is an adjustment amount of the power balancing in a slot k within the adjustment period, is stipulated by an equation 2.

$$\text{Sum } P\_bal=(1-r)*(P\_ref+P\_CPICH-P\_init) \qquad \text{Equation 2}$$

Where $P\_ref$ is a reference power offset value being decided by the base station controller, $P\_CPICH$ is a power value of a common pilot signal being transmitted by the base station, and $P\_init$ is a transmission power of the downstream DPCCH in the final slot of the adjustment period of the previous power balancing.

On the other hand, at the time of the intermittent transmission mode, the adjustment amount $P\_bal(k)$ at the intermittent transmission mode per k slots is changed. Specifically, an adjustment ratio $r$ at the time of the normal mode is changed to $r\_gating$, being a parameter of the adjustment ratio at the time of the intermittent transmission mode. Specifically, the adjustment amount is shown by the following equation 4.

$$\text{Sum } P\_bal(k)=(1-r\_gating)*(P\_ref+P\_CPICH-P\_init)$$

or $$\text{Sum } P\_bal(k)=(1-r\_gating)*(P\_ref\_gating+P\_CPICH+P\_init) \qquad \text{Equation 4}$$

Where $r\_gating$, which is a parameter that the base station controller decides and notifies to the base station at the time of starting a communication, is a value equal to or less than 1, and assuming the value larger than the adjustment ratio $r$ that is used at the normal mode makes it possible to lower the adjustment amount of the power balancing as compared with the adjustment amount at the time of the normal mode, and the power balancing stops when $r\_gating=1$. Further, $P\_ref\_gating$ is a reference power offset value at the time of the intermittent transmission mode.

Further, herein, it was assumed that the base station controller decided $r\_gating$, and notified it to the base station; however the present invention is not limited to it, and the base station may decide the value that is smaller than 1 and yet larger than r of the normal mode at random, or based upon a ratio of the number of the slots in which the control signal is transmitted during the intermittent transmission mode, or the like.

(3) The adjustment amount of the power balancing is multiplied by a constant, thereby lowering the adjustment amount of the power balancing.

The power control of the downlink in the normal mode is shown by an equation 1.

$$P(k)=P(k-1)+P\_TPC(k)+P\_bal(k) \quad \text{Equation 1}$$

Where P(k) is a transmission power at the time of a k slot, P(k−1) is a transmission power at the time of a (k−1) slot, P_TPC(k) is an adjustment amount at the time of a k slot based upon the closed-loop power control, P_bal(k), which is an adjustment amount of the power balancing in a slot k within the adjustment period, is stipulated by an equation 2.

$$\text{Sum } P\_bal=(1-r)*(P\_ref+P\_CPICH-P\_init) \quad \text{Equation 2}$$

Where P_bal(k) is changed by multiplying the adjustment amount at the intermittent transmission mode in the balance adjustment period by a constant f_gating. Specifically, it is shown by the following equation 5.

$$\text{Sum } P\_bal(k)=f\_gating*(1-r)*(P\_ref+P\_P\text{-CPICH}-P\_init) \quad \text{Equation 5}$$

Where f_gating, which is a constant, is a parameter that the base station controller decides and notifies to the base station at the time of starting a communication, and defining f_gating as f_gating<1 makes it possible to lower the adjustment amount of the power balancing as compared with the adjustment amount at the time of the normal mode.

In the foregoing, an example was shown of, in the normal mode, employing the transmission power control being performed based upon Sum P_bal(k) obtained by employing the equation 2, and in the intermittent transmission mode, employing the transmission power control being performed based upon Sum P_bal(k) obtained by employing the equation 5, namely, an example of separately using the different transmission power controls; however f_gating may be defined as f_gating=1 at the time of the normal mode, and as f_gating being less than 1 at the time of the intermittent transmission mode because the transmission power control based upon Sum P_bal(k) obtained by employing the equation 5 has been performed.

(4) The base station computes a reduction rate of the adjustment amount of the power balancing based upon a ratio of the number of the slots in which the control signal is transmitted at the time of the intermittent transmission mode, and lowers the adjustment amount.

The power control of the downlink in the normal mode is shown by an equation 1.

$$P(k)=P(k-1)+P\_TPC(k)+P\_bal(k) \quad \text{Equation 1}$$

Where P(k) is a transmission power at the time of a k slot, P(k−1) is a transmission power at the time of a (k−1) slot, P_TPC(k) is an adjustment amount at the time of a k slot based upon the closed-loop power control, and P_bal(k), which is an adjustment amount of the power balancing in a slot k within the adjustment period, is stipulated by an equation 2.

$$\text{Sum } P\_bal=(1-r)*(P\_ref+P\_CPICH-P\_init) \quad \text{Equation 2}$$

Where f_gating is defined as a value based upon a ratio of the number of the slots in which the control signal is transmitted by using the DPCCH at the time of intermittent transmission mode, and this f_gating is multiplied by the adjustment amount at the time of the intermittent transmission mode in the balance adjustment period, thereby changing P_bal(k). Specifically, it is shown by the following equation 6.

$$\text{Sum } P\_bal(k)=f\_gating*(1-r)*(P\_ref+P\_P\text{-CPICH}-P\_init) \quad \text{Equation 6}$$

Where f_gating is a value based upon the number N of the slots, being a DPCCH gating cycle, and the number x of the slots for transmitting the control signal, out of N slots, at the time of the intermittent transmission mode, and for example, f_gating may be decided as f_gating=x/N. Upon showing a specific example, f_gating=2/10=⅕ can set to the mobile station for which the pattern such that the control signal is transmitted only in two slots (=x) out of ten slots (=N) in the DPCCH has been applied.

In the foregoing, an example was shown of, in the normal mode, employing the transmission power control being performed based upon Sum P_bal(k) obtained by employing the equation 2, and in the intermittent transmission mode, employing the transmission power control being performed based upon Sum P_bal(k) obtained by employing the equation 6, namely, an example of separately using the different transmission power controls; however f_gating may be defined as f_gating=1 at the time of the normal mode, and as a value computed in the foregoing method at the time of the intermittent transmission mode because the transmission power control has been performed based upon Sum P_bal(k) obtained by employing the equation 6.

2. The parameter of the power balancing is decided responding to whether or not to apply the DPCCH gating.

The DPCCH gating is applied, for example, only for a service/mobile station that performs the data transmission for the downlink by employing the HSDPA, and performs the data transmission for the uplink by employing the EUDCH. Thus, the DPCCH gating is not applied, for example, for a service utilizing call switching such as a call service performing the data transmission/reception by employing an uplink/downlink dedicated channel. Thus, the base station controller sets the normal parameter to the power balancing as well. On the other hand, as a rule, by employing the HSDPA and the EUDCH, the data transmission/reception for services utilizing a packet exchange such as a web perusal and VoIP is performed. In such a case, the base station controller decides to apply the DPCCH gating for this mobile station, and yet decides the parameter of the power balancing so that the adjustment ratio by the power balancing becomes smaller, or the adjustment speed becomes slower as compared with the case of the mobile station that is performing the data transmission/reception in the foregoing dedicated channel.

3. The power balancing is performed in the downstream power control only at the time o reflecting a TPC command.

Figure 3:
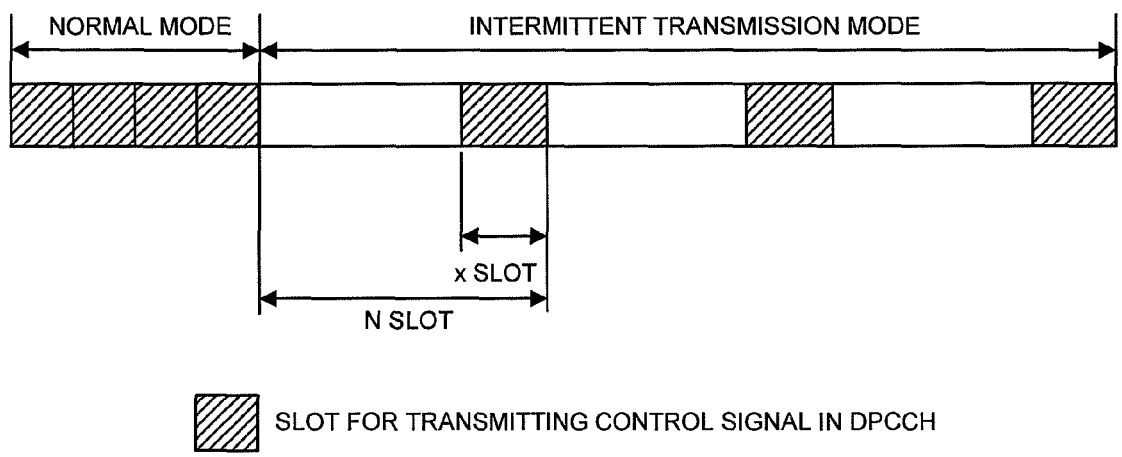
FIG. 3 is a view for explaining DPCCH Gating.
Figure 4:
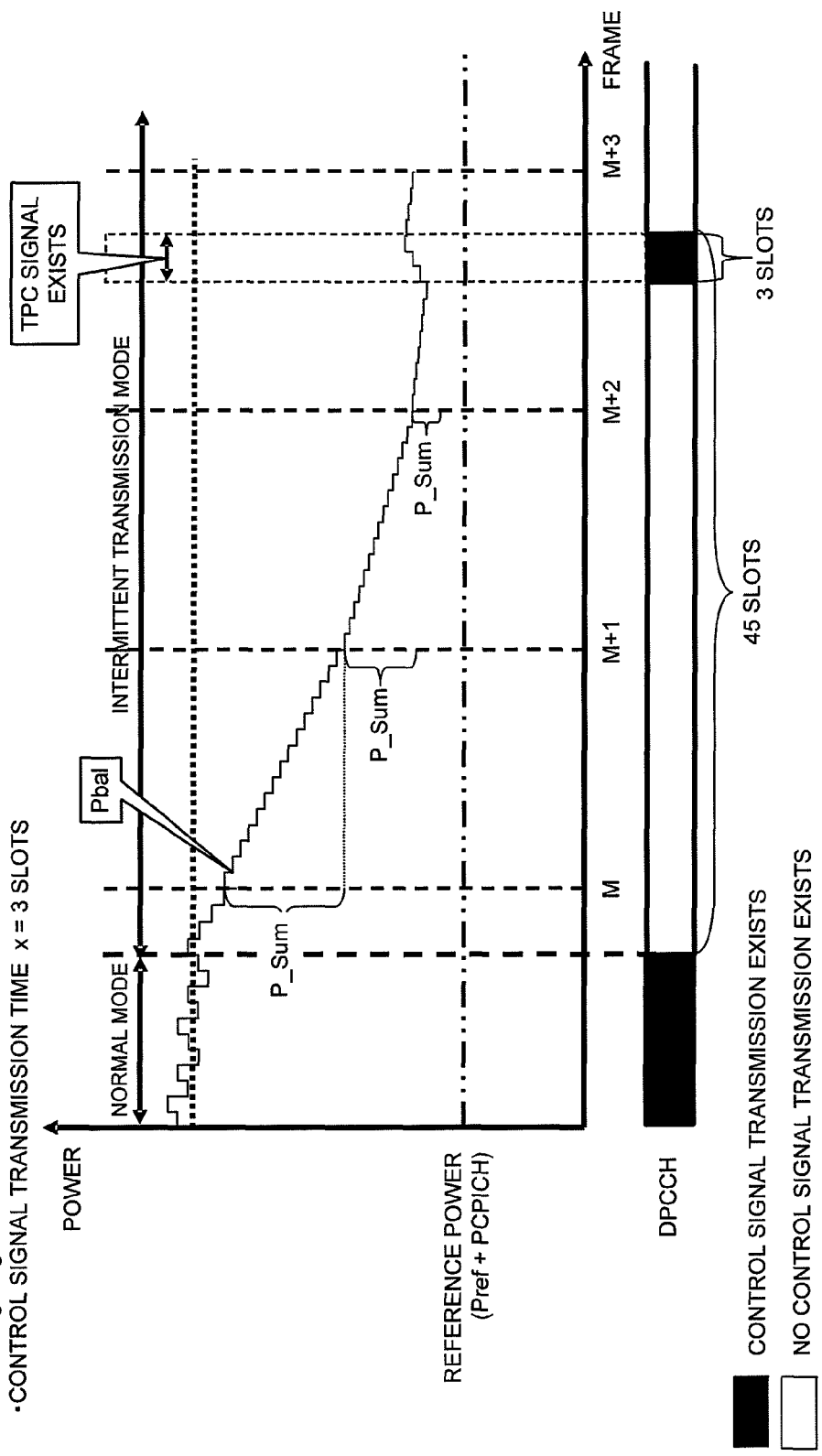
FIG. 4 is a view for explaining the related art.

For example, in the foregoing FIG. 3, the control of the power balancing is performed only in the x slots in which the control signals such as the TPC signal and the pilot signal are transmitted by using the DPCCH. In the slot in which the control of the power balancing is performed, the power control for the downlink in the normal mode is performed, and is specifically showed by an equation 1.

$$P(k)=P(k-1)+P\_TPC(k)+P\_bal(k) \quad \text{Equation 1}$$

Where P(k) is a transmission power at the time of a k slot, P(k−1) is a transmission power at the time of a (k−1) slot, P_TPC(k) is an adjustment amount at the time of a k slot based upon the closed-loop power control, and P_bal(k), which is an adjustment amount of the power balancing in a k slot within the adjustment period, is stipulated by an equation 2.

$$\text{Sum } P\_\text{bal}=(1-r)*(P\_\text{ref}+P\_\text{CPICH}-P\_\text{init}) \quad \text{Equation 2}$$

Hereinafter, a specific example will be explained.

EXAMPLE 1

An example 1 will be explained. The example 1 is an example of lowering the reflection ratio of the adjustment amount of the power balancing at the time of the intermittent transmission mode in the foregoing DPCCH Gating.

Figure 5:
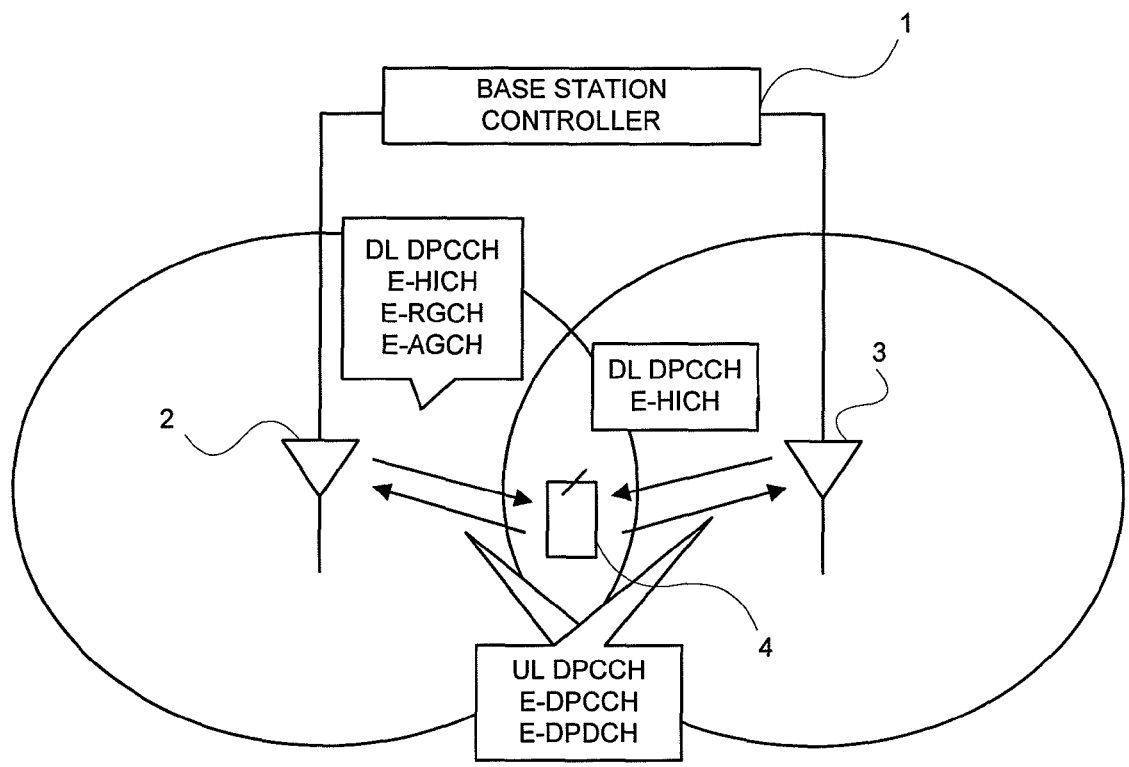
FIG. 5 is a view for a communication system of an example 1.

The method of controlling the transmission power being explained in the example 1 is performed in a cellar system assuming a configuration shown in FIG. 5. A service area of the cellar system of FIG. 5 is divided into a first cell 5 and a second cell 6, in which a first base station 2 and a second base station 3 are arranged, respectively, and a mobile station 4 exists. Each of the first base station 2 and the second base station 3 is connected to a base station controller 1, which is further connected to a communication net (not shown) that is comprised of other base station controllers 1. Additionally, this cellar system includes a large number of the base stations in addition hereto, and a large number of the mobile stations exist in each cell, which is not shown.

The mobile station 4 transmits/receives the control signals such as the TCP signal and the pilot signal to/from each of the base stations 2 and 3 by employing the DPCCH.

Figure 6:
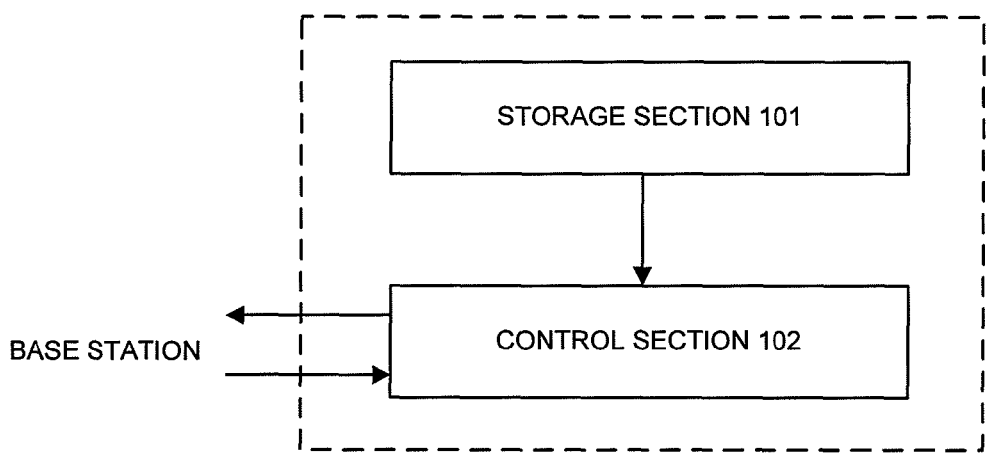
FIG. 6 is a view illustrating a configuration of a base station controller 1.

In FIG. 6, a configuration of the base station controller 1 is shown. The base station controller 1 is configured of a storage section 101 and a control section 102.

The storage section 101 has each parameter stored therein. As a stored parameter, a power value P_CPICH of the common pilot signal being transmitted by the base station, an adjustment amount (width) ΔTPC by the closed-loop transmission power control, and a target SIR, being a target value for the closed-loop transmission power control for the uplink. In addition hereto, as a parameter necessary for the control of the power balancing, a reference power offset value P_ref, an adjustment ratio r by the power balancing, an adjustment period Tint of the power balancing, etc. have been stored in the storage section 101. Further, the parameter as well necessary for the intermittent transmission, for example, x indicative of the number of the slots in which the control signal is transmitted, out of the slots (N slots) within a predetermined cycle that is performed in the foregoing DPCCH Gating, and a number of the slot for transmitting the control signal has been stored.

The control section 102 reads out the power value P_CPICH from the storage section 101 at the time of establishing the base station and notifies it to the base station, and further reads out the other parameters from the storage section 101 at the time of starting a communication (a certain service) with the mobile station and notifies it to the base station. In addition hereto, the control section 102 computes a parameter R_gating for changing the adjustment amount, which is applied in the case that it is determined that the mobile station is in the intermittent transmission mode in the DPCCH Gating, at the time of starting the power balancing, and notifies it to the base station. Additionally, in this example 1, R_gating is computed as x/N with the cycle of the intermittent transmission in the intermittent transmission mode, which is performed in the DPCCH Gating, and the number of the transmission slots assumed to be N slot and x slot, respectively.

Figure 7:
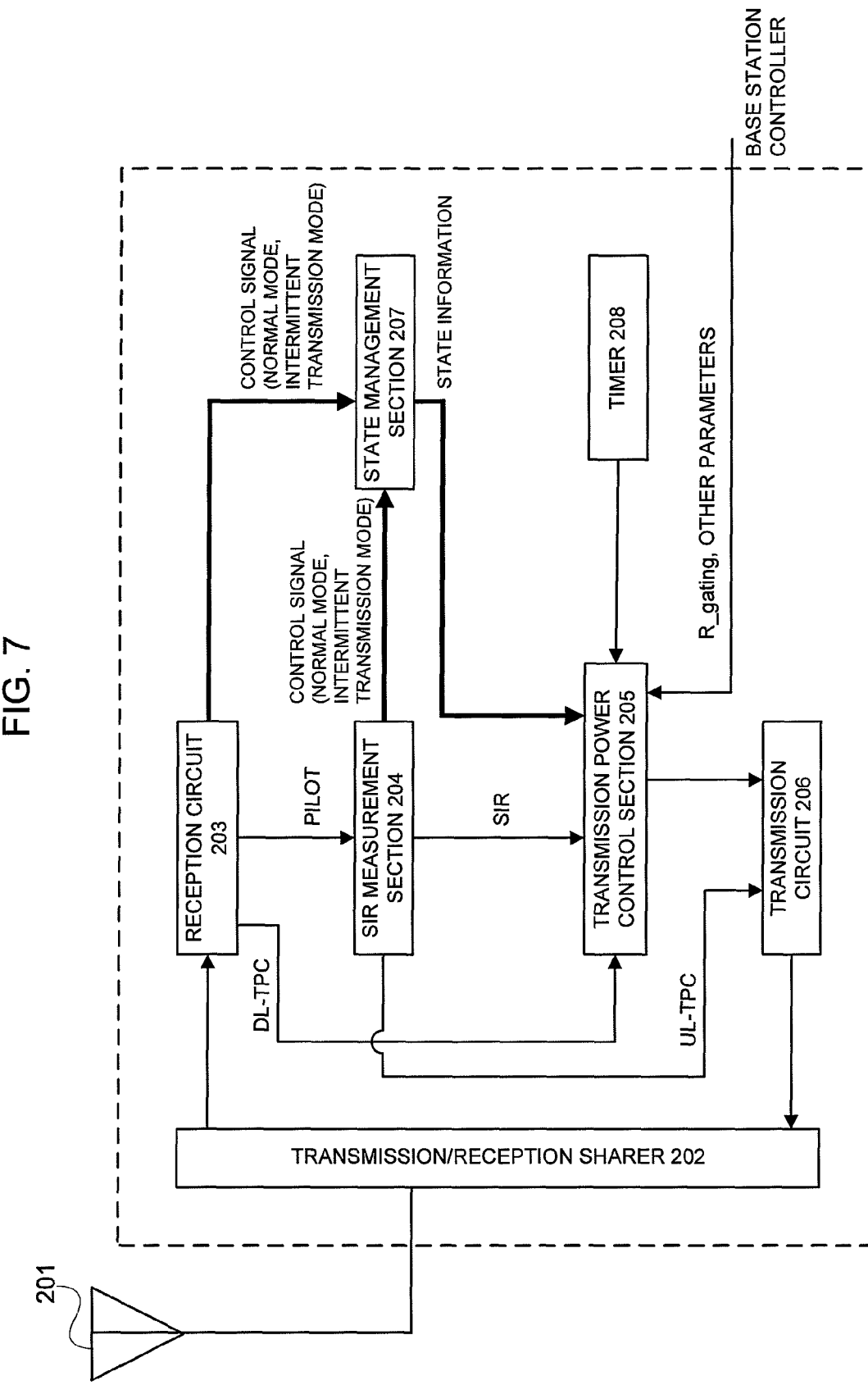
FIG. 7 is a view illustrating a configuration of a base station device of a first base station 2 and a second base station 3.

In FIG. 7, a configuration of a base station device of the first and second base stations 2 an 3 is shown. The base station device is configured of an antenna 201, a transmission/reception sharer 202, a reception circuit 203, an SIR measurement section 204, a transmission power control section 205, a transmission circuit 206, a state management section 207, and a timer 208.

The SIR measurement section 204 is a measurer for measuring a ratio (SIR) of a desired wave power and an interference wave power of the uplink, and with this, whenever receiving the slot that is transmitted by the mobile station, the SIR measurement section 204 measures its upstream SIR. In addition hereto, the SIR measurement section 204 compares the measured upstream SIR with a predetermined target SIR, generates a TPC signal (UL-TPC) instructing that the power be reduced when the measured upstream SIR is equal to more than the target SIR, and a TPC signal (DL-TPC) instructing that the power be increased when the measured upstream SIR is lower than the target SIR, respectively, and sends it to the transmission circuit 206. Further, a configuration may configured so that the SIR measurement section 204 makes it a rule to send the measured upstream SIR to the transmission power control section 205 as well for a purpose of estimating a reliability degree of the control signal received in the uplink, or the like.

Further, the transmission power control section 205, which is a control section for controlling the downstream transmission power responding to a state of the mode of the mobile station 4 being notified by the state management section 207, performs the transmission power control based upon an equation 1 and an equation 2 at the time that the mobile station 4 is in the normal mode of the DPCCH Gating.

$$P(k)=P(k-1)+P\_\text{TPC}(k)+P\_\text{bal}(k) \quad \text{Equation 1}$$

$$\text{Sum } P\_\text{bal}=(1-r)*(P\_\text{ref}+P\_\text{CPICH}-P\_\text{init}) \quad \text{Equation 2}$$

On the other hand, the transmission power control section 205, when the mobile station 4 is in the intermittent transmission mode of the DPCCH Gating, performs the transmission power control based upon an equation 2 and an equation 3 by employing R_gating being notified by the base station controller 1.

$$\text{Sum } P\_\text{bal}=(1-r)*(P\_\text{ref}+P\_\text{CPICH}-P\_\text{init}) \quad \text{Equation 2}$$

$$P(k)=P(k-1)+P\_\text{TPC}(k)+R\_\text{gating}*P\_\text{bal}(k) \quad \text{Equation 3}$$

Additionally, in the foregoing, an example of controlling the transmission power by employing the equation 1 in the normal mode, and controlling the transmission power by employing the equation 3 in the intermittent transmission mode, namely, an example of separately using the different transmission power controls was shown; however R_gating may be defined as R_gating=1 at the time of the normal mode, and as R_gating being less than 1 at the time of the intermittent transmission mode because the transmission power control employing the equation 3 has been performed in the base station.

Herein, with a starting time of the transmission power at the time of the intermittent transmission mode, the following methods are thinkable.

(1) The transmission power control section 205 performs the transmission power control at the time of the intermittent transmission mode of the DPCCH Gating, simultaneously with the reception of a notification saying that the mobile station 4 has come into the intermittent transmission mode of the DPCCH Gating from the state management section 207.

(2) The transmission power control section 205 applies the normal parameter, that is, performs the transmission power control, which is used at the time of the normal mode, in the adjustment period of the power balancing during which the transmission power control section 205 has received a notification from the state management section 207 saying that the mobile station 4 has come into the intermittent transmission mode of the DPCCH Gating. And, the transmission power control section 205 performs the transmission power control, which is used at the time of the intermittent transmission mode, in and since the next adjustment period of the power balancing.

(3) The transmission power control section 205 performs only the closed-loop power control by the TPC signal and stops the control of the power balancing in the adjustment period of the power balancing during which the transmission power control section 205 has received a notification from the state management section 207 saying that the mobile station 4 has come into the intermittent transmission mode of the DPCCH Gating. And, the transmission power control section 205 performs the transmission power control, which is used at the time of the intermittent transmission mode, in and since the next adjustment period of the power balancing.

(4) The transmission power control section 205 performs the transmission power control, which is used at the time of the normal mode, by using the value obtained by multiplying the adjustment amount P_bal of the power balancing at the time of the normal mode by a predetermined value in the adjustment period of the power balancing during which the transmission power control section 205 has received a notification from the state management section 207 saying that the mobile station 4 has come into the intermittent transmission mode of the DPCCH Gating. The predetermined value is decided responding to a ratio of the remaining time of the current adjustment period. And, the transmission power control section 205 performs the transmission power control, which is used at the time of the intermittent transmission mode, in and since the next adjustment period of the power balancing.

The four methods mentioned above are thinkable and any method may be employed.

The state management section 207, which is a management section for managing the state as to whether the mobile station 4 is in the normal mode or in the intermittent transmission mode of the DPCCH Gating, notifies the state of the mobile station 4 to the transmission power control section 205. As a method in which the state management section 207 grasps the state of the mobile station 4, the following methods are thinkable.

(1) The mobile station 4 notifies its state by transmitting the control signal to the base station. The state management section 207 having received this notification via the reception circuit 203 manages the state of the mobile station 4. Herein, as a method of transmitting the control signal, such a method is thinkable of installing a signal indicative of the effect of a change in the state into E-TFCI (E-Transport Format Combination Indicator) that is being transmitted in the E-DPCCH, SI (Scheduling Information) that is being transmitted in the E-DPDCH, or the like. Herein, the so-called E-TFCI is a signal for notifying a format such as a data size of a transport block being transmitted in the E-DPDCH, and the so-called SI is a signal for notifying information necessary for carrying out scheduling in the base station, for example, a data amount etc. accumulated within a buffer of the mobile station.

Further, as a content of the control signal, transit information indicating that the mobile station 4 transits or has transited from the normal mode to the intermittent transmission mode, and the mobile station 4 transits or has transited from the intermittent transmission mode to the normal mode, information indicative of the current state of the mobile station 4, or the like is thinkable.

(2) The base station determines the state of the mobile station 4 autonomously (in a blind manner). For example, the SIR measurement section 204 measures the SIR of the TPC signal of the DPCCH, that of the pilot signal, or the like, and determines that the mobile station 4 is in the intermittent transmission mode in a case where the successive number of the slots of which this SIR is equal to or less than a predetermined threshold SIR_thr is N_thr or more. And, the SIR measurement section 204 notifies this determination result to the state management section 207. Additionally, the base station controller 1 may set SIR_thr and N_thr, and the base station may set them. Additionally, a value smaller than a slot transmission stop period of the DPCCH gating is desirably set as N_thr.

In the base station configured in such a manner, the reception circuit 203 receives the signal for the uplink transmitted from the mobile station 4 via the antenna 201 and the transmission/reception sharer 202. Whenever the reception circuit 203 receives the slot of the signal for the uplink, it separates the data signal from the control signal, and transfers the data signal to a reception processing section, which is not shown. Further, the reception circuit 203 sends the pilot signal being included in the received control signal to the SIR measurement section 204 slot by slot. And, the SIR measurement section 204 measures the reception power of the pilot signal, generates a TPC signal (UL-TPC) for controlling the transmission power for the uplink, sends it to the transmission circuit 206, and sends an SIR measurement result of the pilot signal to the transmission power control section 205.

Further, the reception circuit 203 sends the TCP signal being included in the received control signal to the transmission power control section 205 slot by slot. The transmission power control section 205 computes a downstream transmission power for the signal for the downlink slot by slot by using the TCP signal transmitted from the reception circuit 203, and sends a downstream transmission power control signal indicative of its downstream transmission power to the transmission circuit 206. Herein, the transmission power control section 205 may estimate a reliability degree of the TPC signal based upon a pre-decided quality threshold and an SIR measurement result of the pilot signal being sent by the SIR measurement section 204. And, the transmission power control section 205 may not employ a content of the TPC signal for computing the transmission power when the reliability degree of the TCP signal is low. The transmission power is computed based upon the power change amount by the TPC signal and the adjustment amount by the power balancing as explained so far. The operation of the power balancing was explained in the related art and will be explained below, so it is not described in details herein, and the timer 208 measures the time necessary for determining a lapse of the adjustment period that is employed for this power balancing. Responding to the downstream transmission power control signal, the transmission circuit 206 sets a value being shown by the downstream transmission power control signal to the downstream transmission power for the signal for the downlink. And, the base station transmits the signal for the downlink generated by the transmission circuit 206 to one mobile station or more via the transmission/reception sharer 202 and the antenna 201.

Figure 8:
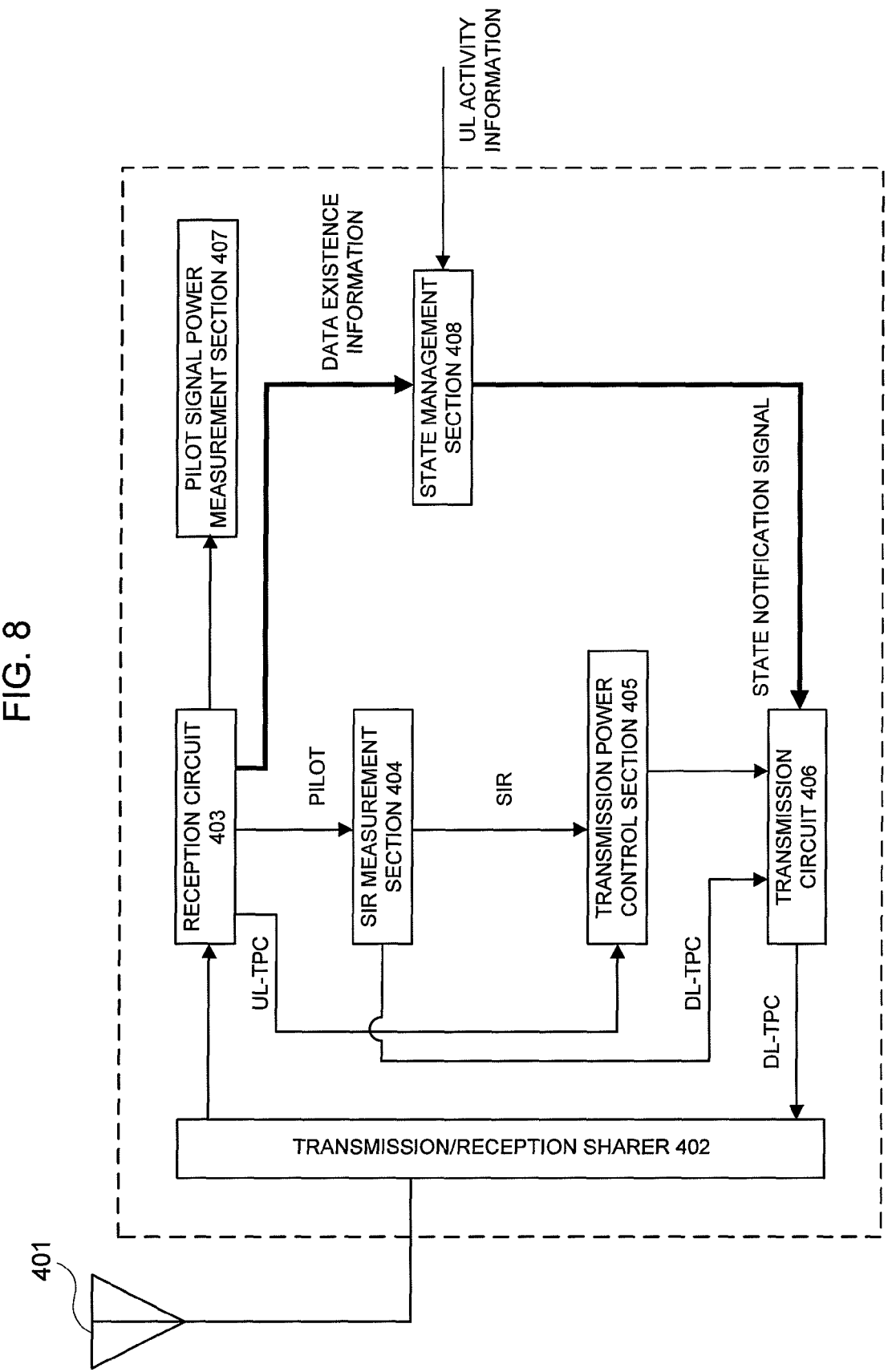
FIG. 8 is a view illustrating a configuration of a mobile station 4.

In FIG. 8, a configuration of the mobile station 4 is shown. The mobile station 4 is configured of an antenna 401, a transmission/reception sharer 402, a reception circuit 403, an SIR measurement section 404, a transmission power control section 405, a transmission circuit 406, a pilot signal power measurement section 407, and a state management section 408.

In the mobile station 4, the reception circuit 403 receives the signal for the downlink transmitted from the base station via the antenna 401 and the transmission/reception sharer 402. The reception circuit 403, upon receipt of the downstream signal, separates the control signal and the data, sends the data to a reception processing section that is not shown, and performs a necessary reception process such as decoding. Further, whenever the reception circuit 403 receives the slot of the signal for the downlink, the SIR measurement section 404 measures the SIR of the pilot signal or the TCP signal being included in the signal for the downlink, and obtains a measurement downstream-SIR value indicative of the downstream SIR. The SIR measurement section 404 compares the measurement downstream-SIR value with a target downstream-SIR value, and outputs a TPC signal (DL-TPC) instructing that the downstream transmission power be increased when the measurement downstream-SIR value is smaller than the target downstream-SIR value. The SIR measurement section 404 outputs a TPC signal (DL-TPC) instructing that the downstream transmission power be reduced when the measurement downstream-SIR value is equal to or more than the target downstream-SIR value. The DL-TPC is supplied to the transmission circuit 406. The transmission circuit 406 transmits the signal for the uplink including the DL-TPC slot by slot to the base station via the transmission/reception sharer 402 and the antenna 401 when an instruction being given by the state management section 408 says the normal mode. Further, the transmission circuit 406 transmits the signal for the uplink including the DL-TPC in the slot in which the signal for the uplink may be transmitted, based upon a predetermined DPCCH transmission pattern (DPCCH gating pattern) when an instruction being given by the state management section 408 says the intermittent transmission mode.

Herein, the state management section 408 makes it a rule to determine and record whether the mobile station is in a state of the normal mode or the intermittent transmission mode, and the method of determining the state can be adopted on the assumption that, for example, one of the followings, or both is satisfied.

(1) The case that the reception circuit 403 notifies the state management section 408 whether or not a data addressed to its own station is included in the received signal at a predetermined cycle, and as a result, it has been determined in the state management section 408 that no data addressed to its own station exists in the downlink over a predetermined time or more.

(2) The case that the state management section 408 has received a signal for notifying that the data, which should be transmitted, does not exist within a buffer over a predetermined time or more as UL activity information from an MAC layer of the mobile station.

Additionally, the foregoing case, which is only one example in this example, is irrelevant to an essence of the invention, and various cases are conceivable. Thus, for example, the following is conceivable: it is not that the mobile station makes a determination autonomously as mentioned above, but that the base station transmits the control signal such that the mode change is explicitly notified by employing the downlink channel, for example, the HS-SCCH, and the reception circuit 403, upon receipt of this signal, notifies its effect to the state management section 408.

Further, the reception circuit 403 sends the upstream TPC signal being included in the received control signal to the transmission power control section 405 slot by slot. The transmission power control section 405 computes a upstream transmission power for the signal for the uplink slot by slot by using the TPC signal sent from the reception circuit 403, and sends an upstream transmission power control signal indicative of its upstream transmission power to the transmission circuit 406. The transmission circuit 406, responding to the upstream transmission power control signal, sets a value being indicated by the upstream transmission power control signal to the upstream transmission power for the signal for the uplink. And the mobile station transmits the signal for the uplink generated by the transmission circuit 406 via the transmission/reception sharer 402 and the antenna 401.

Figure 2:
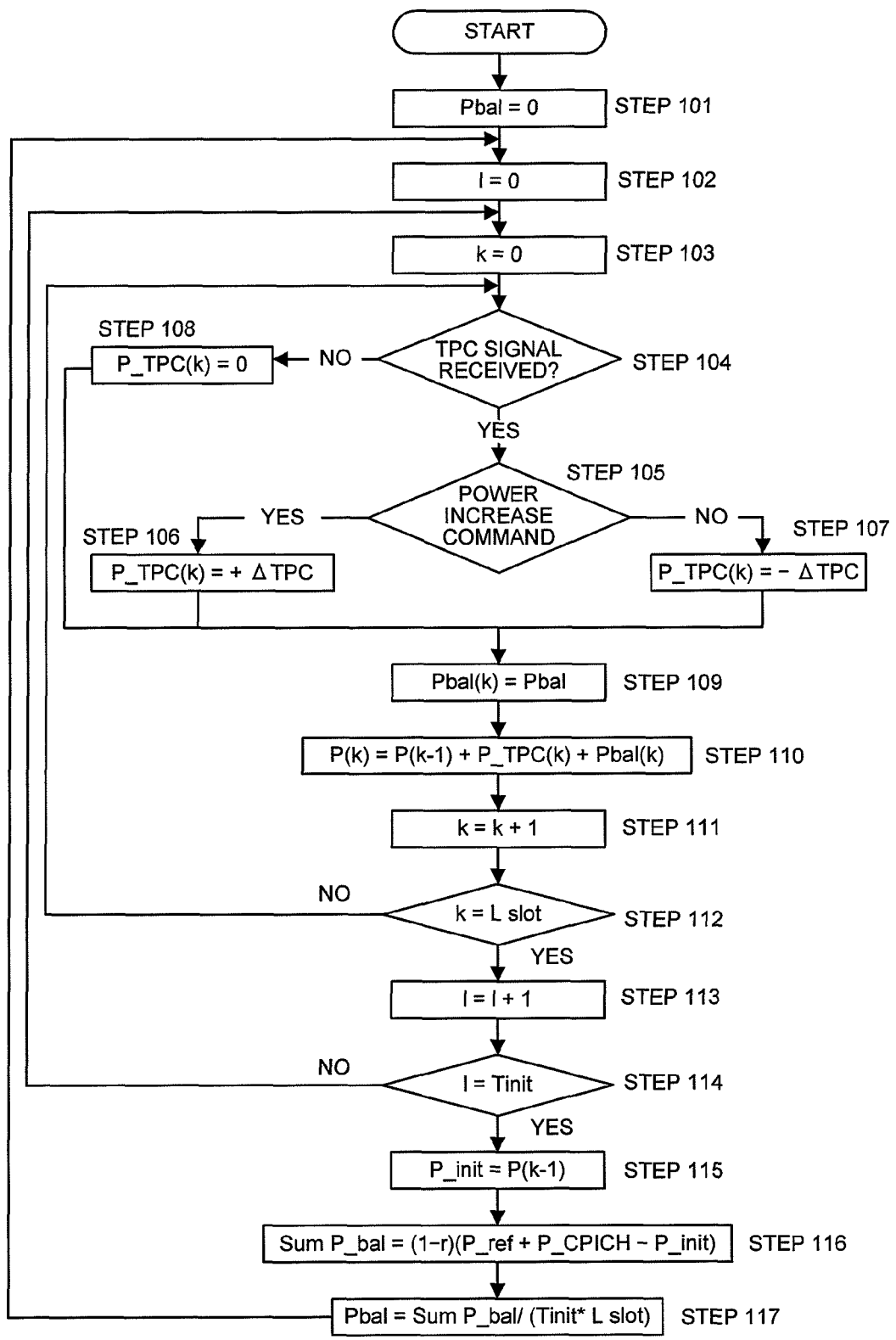
FIG. 2 is a flowchart in which the base station, upon receipt of the TPC signal from the mobile station, decides the transmission power for the downlink in the DPCCH during an execution of the soft handover.
Figure 9:
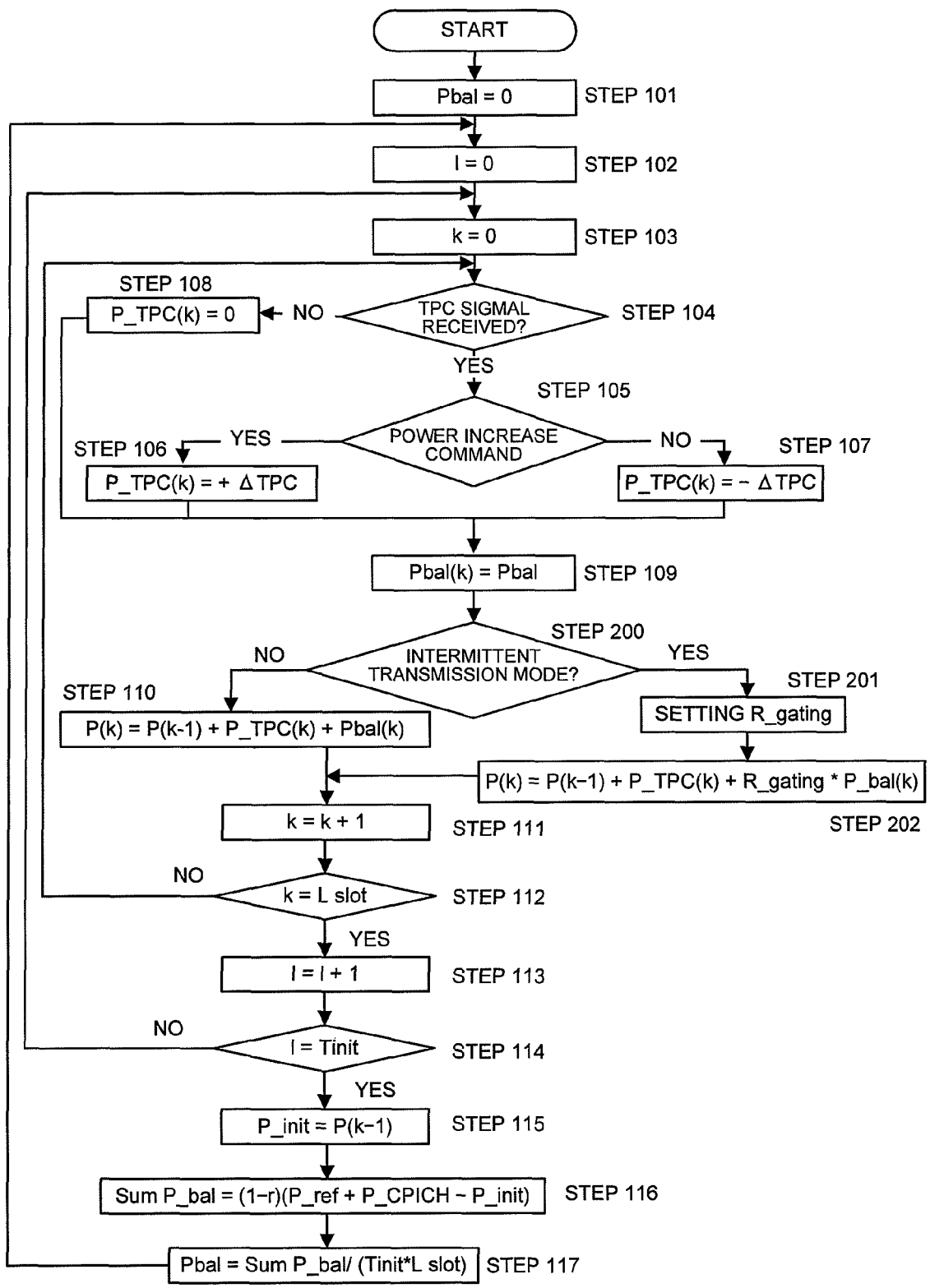
FIG. 9 is an operational flowchart of the example 1.

Next, a transmission power control operation in the example 1 will be explained by employing FIG. 9. Additionally, a step number identical to that of FIG. 2 is affixed to a process identical to that of the conventional transmission power, and its explanation is omitted.

A point in which an operation of the example 1 differs from that of the related art is a process ranging a step 200 to a step 202. At first, in the step 200, the transmission power control section 205 determines whether the mobile station is in the normal mode or the intermittent transmission mode from a notification of the state management section 207. And, when the mobile station is in the normal mode, the operation proceeds to a step 110, and the transmission power control section 205 performs a process similar to the conventional process.

On the other hand, when the mobile station is in the intermittent transmission mode, the transmission power control section 205 performs the transmission power control by an equation 3 by employing R_gating notified by the base station controller 1 (step 202).

$$P(k)=P(k-1)+P\_TPC(k)+R\_gating*P\_bal(k) \qquad \text{Equation 3}$$

Additionally, with the starting time of the transmission power control at the time of the intermittent transmission mode, any of the foregoing four methods is employed.

This example makes it possible to stop or to gradually perform the power adjustment as well for the power balancing in a case where the high speed power control cannot be performed based upon a channel quality because the TPC signal is not transmitted with the DPCCH gating. Thus, it can be avoided that the transmission power of the downstream DPCCH is drawn toward the reference power value of the power balancing, and resultantly becomes a power value too lower or too higher than the power necessary for satisfying the target quality. That is, the power value controlled based upon the channel quality can be maintained, and the power control such that the required SIR is satisfied is enabled in the mobile station. As a result, futile interference and deterioration in the dedicated channel quality in the mobile station can be reduced, and a system throughput as well as a user throughput can be improved.

Further, in this example, an effect of the power balancing can be enhanced because the normal parameter of the power balancing is applied when the mobile station is in the normal mode.

EXAMPLE 2

An example 2 will be explained. The example 2 is an example of lowering the adjustment amount of the power balancing by employing an adjustment ratio of the power balancing different from the adjustment ratio of the power balancing that is used at the time of the foregoing normal mode. Additionally, an explanation of a portion similar to the foregoing example 1 is omitted, and a different portion will be explained.

The storage section 101 has each parameter stored therein. As a stored parameter, a power value P_CPICH of the common pilot signal being transmitted by the base station, an adjustment amount (width) ΔTPC by the closed-loop transmission power control, and a target SIR, being a target value for the closed-loop transmission power control for the uplink. In addition hereto, as a parameter necessary for the control of the power balancing, a reference power offset value P_ref, an adjustment ratio r by the power balancing, an adjustment period Tint of the power balancing, P_ref_gating, being a reference power offset value at the time of the intermittent transmission mode, etc. have been stored in the storage section 101. Further, x slots as well in which the control signal is transmitted, out of the slots (N slots) within a predetermined cycle that is performed in the foregoing DPCCH Gating, have been stored.

The control section 102 reads out the power value P_CPICH from the storage section 101 at the time of establishing the base station, and notifies it to the base station, and further reads out the other parameters from the storage section 101 at the time of starting a communication (a certain service) with the mobile station, and notifies it to the base station. In addition hereto, the control section 102 computes r_gating, being a parameter of the adjustment ratio at the time of the intermittent transmission mode, which is applied when it is determined at the time of setting up the power balancing that the mobile station is in the intermittent transmission mode in the DPCCH Gating, and notifies it to the base station. Additionally, in this example 2, it is assumed that r_gating is computed from r_gating=1−(x/N)*(1−r) where N is the cycle of the intermittent transmission in the intermittent transmission mode, which is performed in the DPCCH Gating, and x is the number of the transmission slots; however the method of deciding r_gating in the present invention is not limited to this. For example, r_gating may be decided so that it has some negative correlation to a ratio of the number of the slots that are transmitted during the intermittent transmission period, and the value, which is larger than r of the normal mode and yet smaller than 1, may be selected at random.

The transmission power control section 205 of the base station, which is a control section for controlling the downstream transmission power responding to a state of the mode of the mobile station 4 being notified by the state management section 207, performs the transmission power control based upon an equation 1 and an equation 2 at the time that the mobile station 4 is in the normal mode of the DPCCH Gating.

$$P(k)=P(k-1)+P\_TPC(k)+P\_bal(k) \quad \text{Equation 1}$$

$$\text{Sum } P\_bal=(1-r)*(P\_ref+P\_CPICH-P\_init) \quad \text{Equation 2}$$

On the other hand, the transmission power control section 205, when the mobile station 4 is in the intermittent transmission mode of the DPCCH Gating, computes Sum P_bal(k) based upon an equation 4 by employing P_ref_gating and r_gating being notified by the base station controller 1, and performs the transmission power control according to the equation 1 based upon this Sum P_bal(k).

$$\text{Sum } P\_bal(k)=(1-r\_gating)*(P\_ref\_gating+P\_P\_CPICH+P\_init) \quad \text{Equation 4}$$

Additionally, in the equation 4, a value identical to Pref of the normal mode may be set to P_ref_gating.

Figure 10:
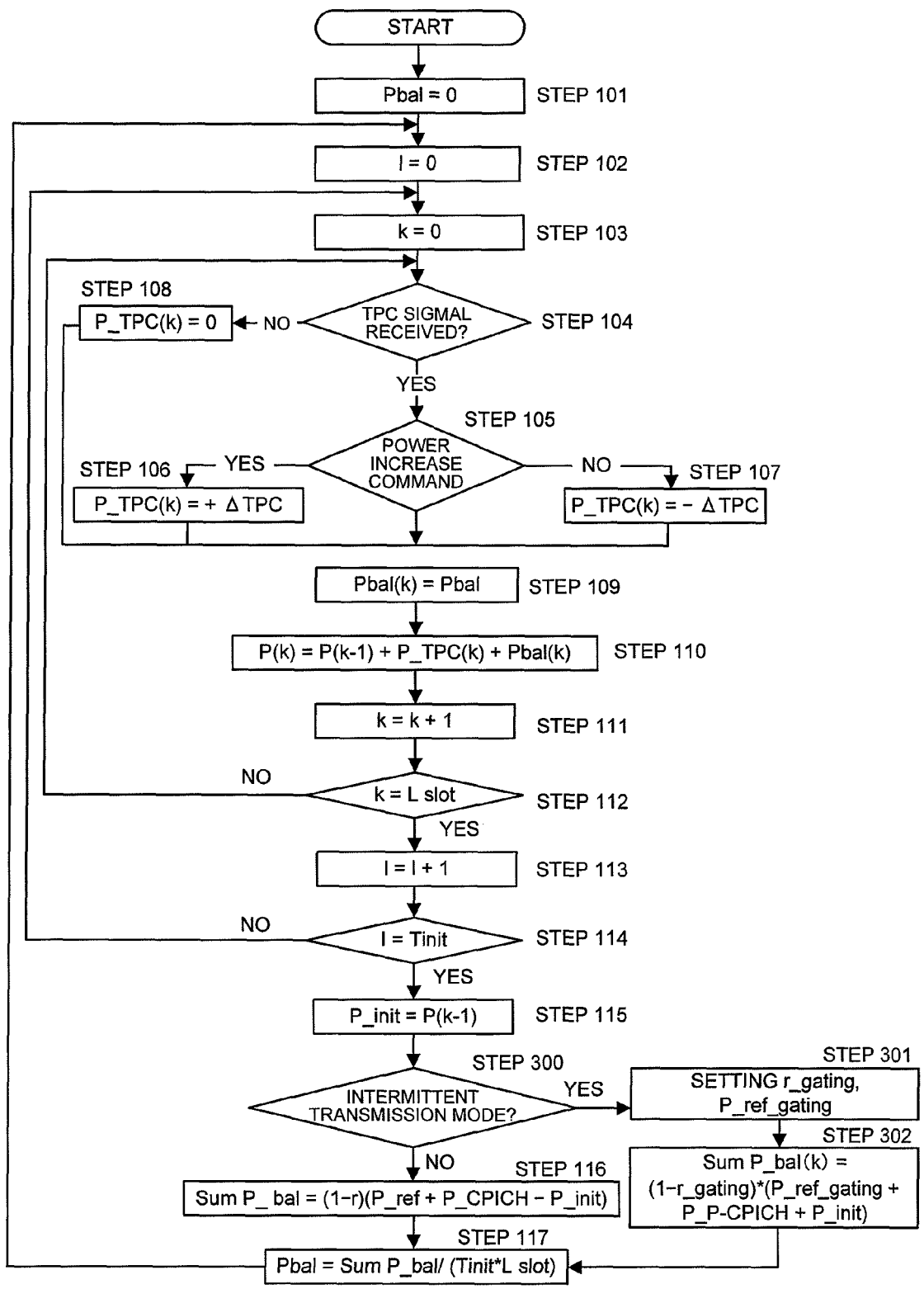
FIG. 10 is an operational flowchart of an example 2.

Next, an operation in the example 2 will be explained by employing FIG. 10. Additionally, a step number identical to that of FIG. 2 is affixed to a process identical to that of the conventional transmission power, and its explanation is omitted.

A point in which an operation of the example 2 differs from that of the related art is a process ranging a step 300 to a step 302. At first, in the step 300, the transmission power control section 205 determines whether the mobile station is in the normal mode or the intermittent transmission mode from a notification of the state management section 207. And, when the mobile station is in the normal mode, the operation proceeds to the step 110, and the transmission power control section 205 performs a process similar to the conventional process.

On the other hand, when the mobile station is in the intermittent transmission mode, the transmission power control section 205 computes Sum P_bal(k) based upon the equation 4 (step 302) by employing P_ref_gating and r_gating notified by the base station controller 1 (step 301). And, the operation proceeds to the step 117, and the transmission power control section 205 performs a process similar to the conventional process.

Additionally, with the starting time of the transmission power control at the time of the intermittent transmission mode, any of the foregoing four methods is employed.

This example makes it possible to stop or to gradually perform the power adjustment as well for the power balancing in a case where the high speed power control cannot be performed based upon a channel quality because the TPC signal is not transmitted with the DPCCH gating. Thus, it can be avoided that the transmission power of the downstream DPCCH is drawn toward the reference power value of the power balancing, and resultantly becomes a power value too lower or too higher than the power necessary for satisfying the target quality. That is, the power value controlled based upon the channel quality can be maintained, and the power control such that the required SIR is satisfied is enabled in the mobile station. As a result, futile interference and deterioration in the dedicated channel quality in the mobile station can be reduced, and a system throughput as well as a user throughput can be improved.

Further, in this example, an effect of the power balancing can be enhanced because the normal parameter of the power balancing is applied when the mobile station is in the normal mode.

EXAMPLE 3

An example 3 will be explained. The example 3 is an example of lowering the adjustment amount of the power balancing by multiplying the foregoing adjustment amount of the power balancing by a constant. Additionally, an explanation of a portion similar to the foregoing example 1 is omitted, and a different portion will be explained.

The storage section 101 has each parameter stored therein. As a stored parameter, a power value P_CPICH of the common pilot signal being transmitted by the base station, an adjustment amount (width) ΔTPC by the closed-loop transmission power control, and a target SIR, being a target value for the closed-loop transmission power control for the uplink. In addition hereto, as a parameter necessary for the control of the power balancing, a reference power offset value P_ref, an adjustment ratio r by the power balancing, and an adjustment period Tint of the power balancing have been stored in the storage section 101. Further, x slots as well in which the control signal is transmitted, out of the slots (N slots) within a predetermined cycle that is performed in the foregoing DPCCH Gating, have been stored. In addition hereto, the storage section 101 has f_gating stored therein, which is applied when it is determined that the mobile station is in the intermittent transmission mode. Additionally, herein, f_gating is defined as x/N.

The transmission power control section 205 of the base station, which is a control section for controlling the downstream transmission power responding to a state of the mode of the mobile station 4 being notified by the state management section 207, performs the transmission power control based upon an equation 1 and an equation 2 at the time that the mobile station 4 is in the normal mode of the DPCCH Gating.

$$P(k)=P(k-1)+P\_TPC(k)+P\_bal(k) \qquad \text{Equation 1}$$

$$\text{Sum } P\_bal=(1-r)*(P\_ref+P\_CPICH-P\_init) \qquad \text{Equation 2}$$

On the other hand, the transmission power control section 205, when the mobile station 4 is in the intermittent transmission mode of the DPCCH Gating, computes Sum P_bal(k) based upon an equation 5 by employing f_gating being notified by the base station controller 1, and performs the transmission power control according to the equation 1 based upon this Sum P_bal(k).

$$\text{Sum } P\_bal(k)=f\_gating*(1-r)*(P\_ref+P\_P\text{-CPICH}-P\_init) \qquad \text{Equation 5}$$

Additionally, in the foregoing, an example was shown of, in the normal mode, employing the transmission power control being performed based upon Sum P_bal(k) obtained by employing the equation 2, and in the intermittent transmission mode, employing the transmission power control being performed based upon Sum P_bal(k) obtained by employing the equation 5, namely, an example of separately using the different transmission power controls; however f_gating may be defined as f_gating=1 at the time of the normal mode, and as f_gating being less than 1 at the time of the intermittent transmission mode because the transmission power control based upon Sum P_bal(k) obtained by employing the equation 5 has been performed.

Figure 11:
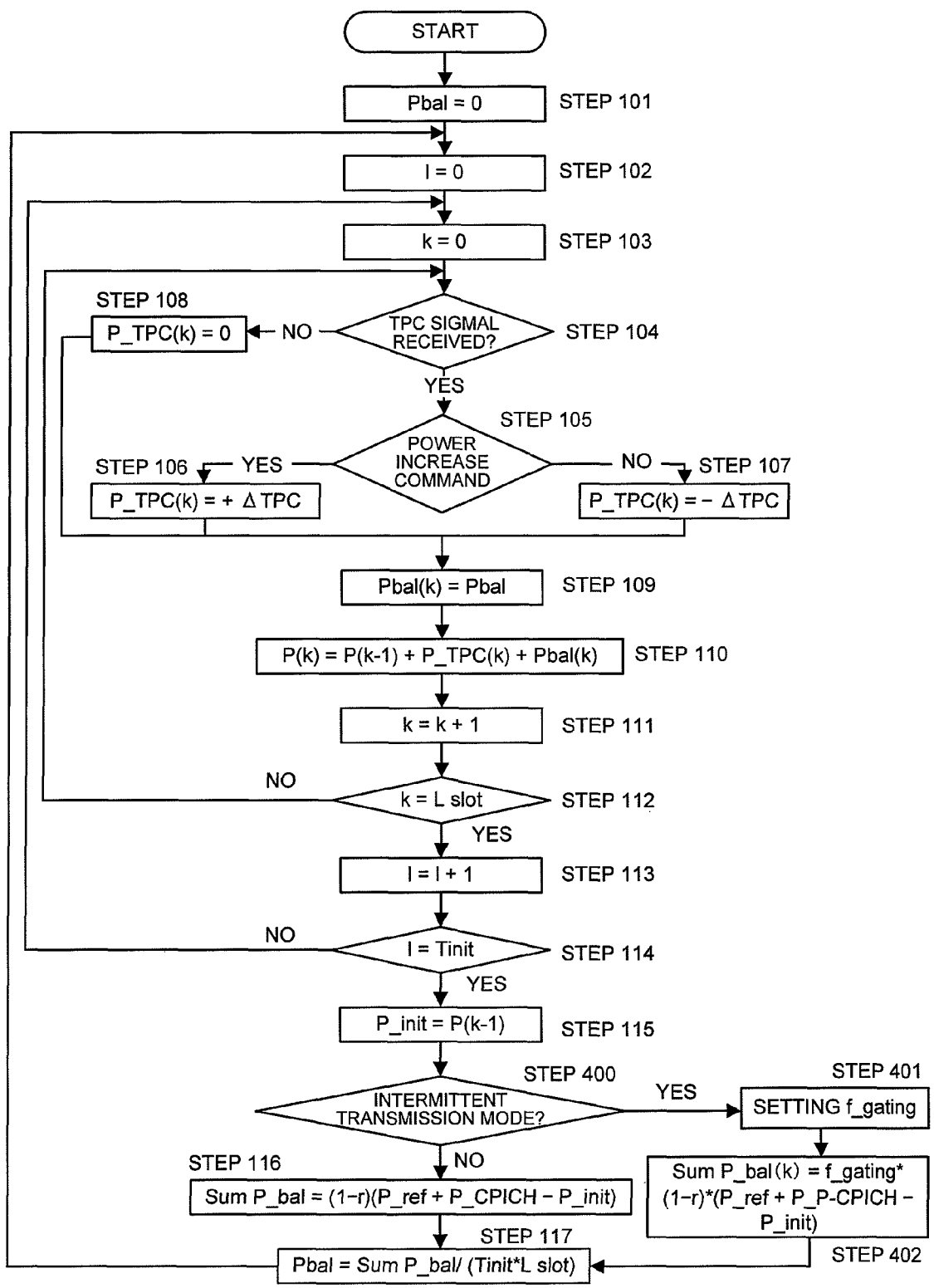
FIG. 11 is an operational flowchart of an example 3.

Next, an operation in the example 3 will be explained by employing FIG. 11. Additionally, a step number identical to that of FIG. 2 is affixed to a process identical to that of the conventional transmission power, and its explanation is omitted.

A point in which an operation of the example 3 differs from that of the related art is a process ranging a step 400 to a step 402. At first, in the step 400, the transmission power control section 205 determines whether the mobile station is in the normal mode or the intermittent transmission mode from a notification of the state management section 207. And, when the mobile station is in the normal mode, the operation proceeds to the step 110, and the transmission power control section 205 performs a process similar to the conventional process.

On the other hand, when the mobile station is in the intermittent transmission mode, the transmission power control section 205 computes Sum P_bal(k) based upon the equation 4 (step 402) by employing f_gating notified by the base station controller 1 (step 401). And, the operation proceeds to the step 117, and the transmission power control section 205 performs a process similar to the conventional process.

Additionally, with the starting time of the transmission power control at the time of the intermittent transmission mode, any of the foregoing four methods is employed.

This example makes it possible to stop or to gradually perform the power adjustment as well for the power balancing in a case where the high speed power control cannot be performed based upon a channel quality because the TPC signal is not transmitted with the DPCCH gating. Thus, it can be avoided that the transmission power of the downstream DPCCH is drawn toward the reference power value of the power balancing, and resultantly becomes a power value too lower or too higher than the power necessary for satisfying the target quality. That is, the power value controlled based upon the channel quality can be maintained, and the power control such that the required SIR is satisfied is enabled in the mobile station. As a result, futile interference and deterioration in the dedicated channel quality in the mobile station can be reduced, and a system throughput as well as a user throughput can be improved.

Further, in this example, an effect of the power balancing can be enhanced because the normal parameter of the power balancing is applied when the mobile station is in the normal mode.

EXAMPLE 4

An example 4 will be explained. The example 4 is an example of lowering the adjustment amount of the power balancing by employing a reduction ratio of the adjustment amount of the power balancing computed based upon a ratio of the number of the slots in which the control signal is transmitted at the time that the base station is in the foregoing intermittent transmission mode. Additionally, an explanation of a portion similar to the foregoing example 1 is omitted, and a different portion will be explained.

The storage section 101 has each parameter stored therein. As a stored parameter, a power value P_CPICH of the common pilot signal being transmitted by the base station, an adjustment amount (width) ΔTPC by the closed-loop transmission power control, and a target SIR, being a target value for the closed-loop transmission power control for the uplink. In addition hereto, as a parameter necessary for the control of the power balancing, a reference power offset value P_ref, an adjustment ratio r by the power balancing, an adjustment period Tint of the power balancing, etc. have been stored in the storage section 101. Further, x slots as well in which the control signal is transmitted, out of the slots (N slots) within a predetermined cycle that is performed in the foregoing DPCCH Gating, have been stored.

Further, the transmission power control section 205 in the base station computes a parameter f_gating, which is used for a purpose of computing the adjustment amount of the power balancing during the intermittent transmission mode, based upon the parameters of DPCCH Gating, i.e. the cycle N and the number x of the slots in which the control signal is transmitted. Herein, as one example, it is assumed that f_gating is computed as f_gating=x/N; however the computation method that is applicable to the present invention is not limited to this, and the computation may be operated so that f_gating becomes such a value that has a positive correlation with a ratio of the number of the slots in which the control signal is transmitted during the intermittent transmission mode or in a similar way.

The transmission power control section 205 of the base station, which is a control section for controlling the downstream transmission power responding to a state of the mode of the mobile station 4 being notified by the state management section 207, performs the transmission power control based upon an equation 1 and an equation 2 at the time that the mobile station 4 is in the normal mode of the DPCCH Gating.

$$P(k)=P(k-1)+P\_TPC(k)+P\_bal(k) \quad \text{Equation 1}$$

$$\text{Sum } P\_bal=(1-r)*(P\_ref+P\_CPICH-P\_init) \quad \text{Equation 2}$$

On the other hand, the transmission power control section 205, when the mobile station 4 is in the intermittent transmission mode of the DPCCH Gating, computes Sum P_bal(k) based upon an equation 6 by employing f_gating being notified by the base station controller 1, and performs the transmission power control according to equation 1 based upon this Sum P_bal(k).

$$\text{Sum } P\_bal(k)=f\_gating*(1-r)*(P\_ref+P\_P\text{-CPICH}-P\_init) \quad \text{Equation 6}$$

Additionally, in the foregoing, an example was shown of, in the normal mode, employing the transmission power control being performed based upon Sum P_bal(k) obtained by employing the equation 2, and in the intermittent transmission mode, employing the transmission power control being performed based upon Sum P_bal(k) obtained by employing the equation 6, namely, an example of separately using the different transmission power controls; however f_gating may de defined as f_gating=1 in the normal mode, and as a value computed with the foregoing method in the intermittent transmission mode because the transmission power control based upon Sum P_bal(k) obtained by employing the equation 6 has been performed.

Figure 12:
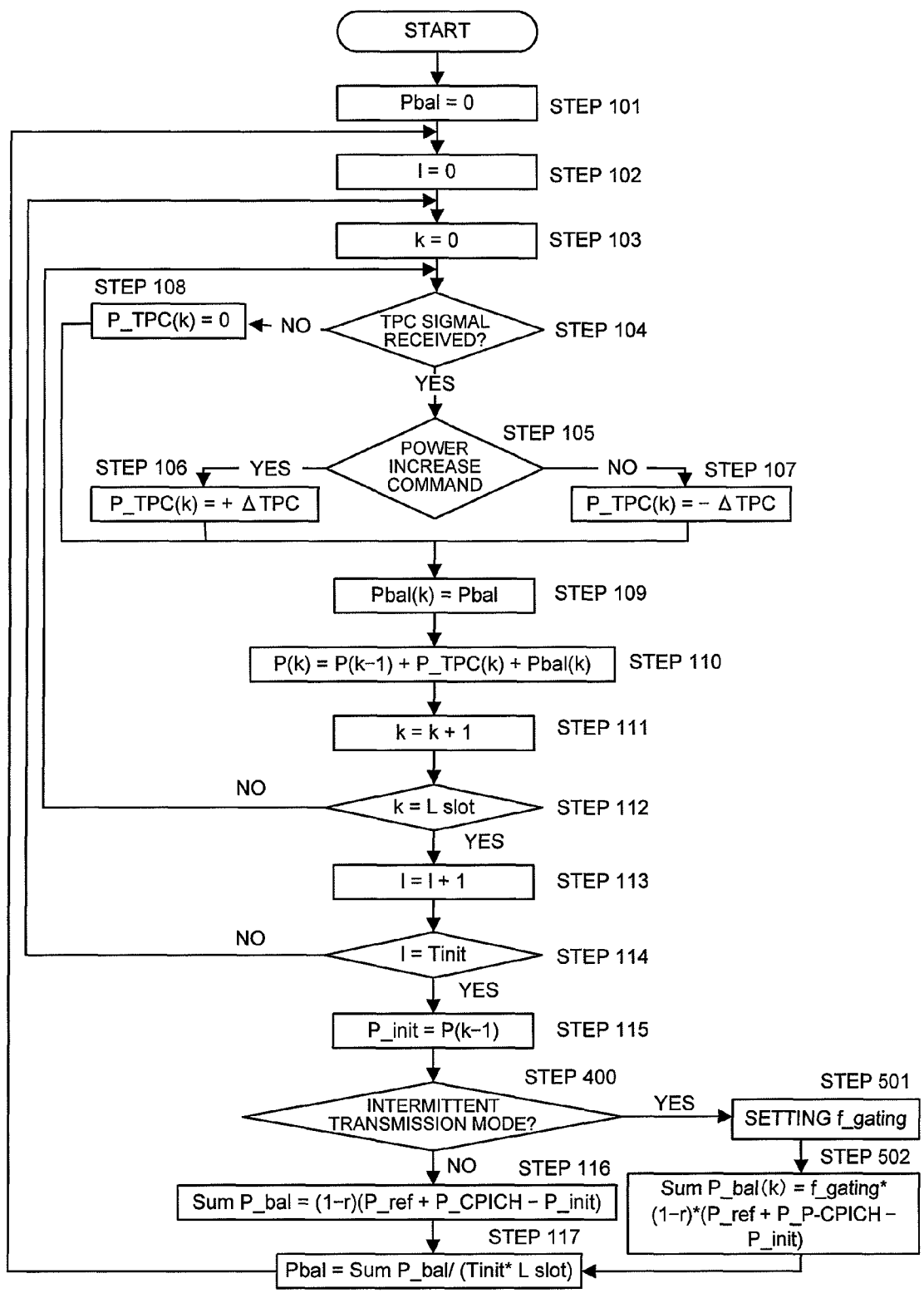
FIG. 12 is an operational flowchart of an example 4.

Next, an operation in the example 4 will be explained by employing FIG. 12. Additionally, a step number identical to that of FIG. 2 is affixed to a process identical to that of the conventional transmission power, and its explanation is omitted.

A point in which an operation of the example 4 differs from that of the related art is a process ranging a step 500 to a step 502. At first, in the step 500, the transmission power control section 205 determines whether the mobile station is in the normal mode or the intermittent transmission mode from a notification of the state management section 207. And, when the mobile station is in the normal mode, the operation proceeds to the step 110, and the transmission power control section 205 performs a process similar to the conventional process.

On the other hand, when the mobile station is in the intermittent transmission mode, the transmission power control section 205 computes Sum P_bal(k) based upon the equation 6 (step 502) by employing the foregoing f_gating (step 501). And, the operation proceeds to the step 117, and the transmission power control section 205 performs a process similar to the conventional process.

Additionally, with the starting time of the transmission power control at the time of the intermittent transmission mode, any of the foregoing four methods is employed.

This example makes it possible to stop or to gradually perform the power adjustment as well for the power balancing in a case where the high speed power control cannot be performed based upon a channel quality because the TPC signal is not transmitted with the DPCCH gating. Thus, it can be avoided that the transmission power of the downstream DPCCH is drawn toward the reference power value of the power balancing, and resultantly becomes a power value too lower or too higher than the power necessary for satisfying the target quality. That is, the power value controlled based upon the channel quality can be maintained, and the power control such that the required SIR is satisfied is enabled in the mobile station. As a result, futile interference and deterioration in the dedicated channel quality in the mobile station can be reduced, and a system throughput as well as a user throughput can be improved.

Further, in this example, an effect of the power balancing can be enhanced because the normal parameter of the power balancing is applied when the mobile station is in the normal mode.

EXAMPLE 5

An example 5 will be explained. In the example 5, a determination as to whether or not to apply the DPCCH gating is made depending upon a communication (service) that is initiated for the mobile station, and for the mobile station for which the DPCCH gating is applied, the parameter of the power balancing such that the adjustment ratio by the power balancing becomes smaller or the adjustment speed becomes slower as compared with the case of the mobile station that is performing the data transmission/reception by using the DPCCH is set. On the other hand, for the mobile station for which the DPCCH gating is not applied, the normal parameter is set to perform the power balancing.

Figure 13:
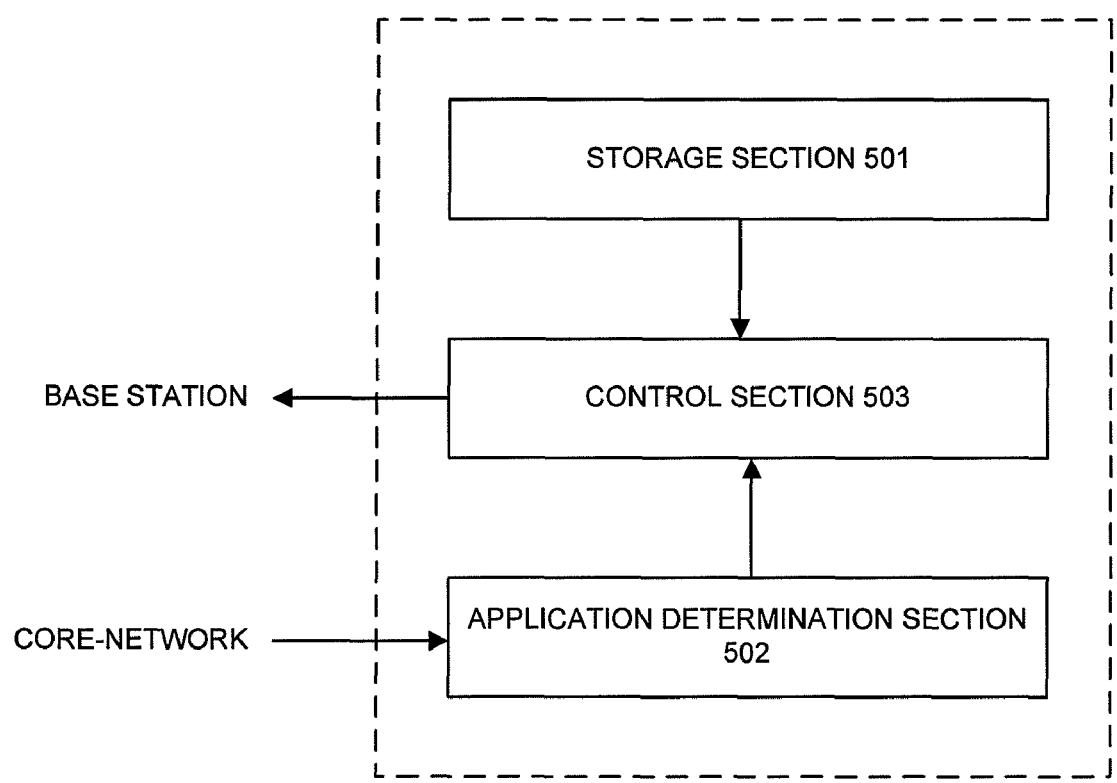
FIG. 13 is a view illustrating a configuration of a base station controller of an example 5.

FIG. 13 is a configuration view of the base station controller of the example 5.

The base station controller is configured of a storage section 501, an application determination section 502, and a control section 503.

Each parameter explained in the foregoing examples has been stored in the storage section 501, and the parameter as well for the mobile station for which the DPCCH gating is applied has been stored as a characteristic parameter of the example 5. Specifically, as a parameter, there exist an adjustment ratio r by the power balancing for the mobile station for which the DPCCH gating is applied, and an adjustment period for the mobile station for which the DPCCH gating is applied. The values of these r and adjustment period are set at a higher level for the mobile station for which the DPCCH gating is applied than for the mobile station for which the DPCCH gating is not applied, and setting r as r=1 yields an effect equivalent to the stoppage.

The application determination section 502 is a determination section for determining whether or not to apply the DPCCH gating for the mobile station based upon a service of the mobile station acquired from a core-network etc. Specifically, the DPCCH gating is applied for a service that performs the data transmission for the downlink by employing the HSDPA and performs the data transmission for the uplink by employing the EUDCH, and the DPCCH gating is not applied, for example, for a service utilizing call switching such as a call service performing data transmission/reception by employing an uplink/downlink dedicated channel. On the other hand, as a rule, by employing the HSDPA and the EUDCH, the data transmission/reception for services utilizing a packet exchange such as a web perusal and VoIP is performed. In such a case, the base station controller applies the DPCCH gating for this mobile station.

The control section 503, upon receipt of a determination result of the application determination section 502, reads out the normal parameter of the power balancing from storage section 501 for the mobile station for which the DPCCH gating is not applied, and notifies it to the base station. On the other hand, the control section 503 reads out the parameters such as r and the adjustment period, which are used in the case of applying the DPCCH gating, from the storage section 501 for the mobile station for which the DPCCH gating is applied, and notifies them to the base station.

The base station to which a notification has been given performs the transmission power control as before for the mobile station base upon the notified parameter.

This example makes it possible to stop or to gradually perform the power adjustment as well for the power balancing in a case where the high speed power control cannot be performed based upon a channel quality because the TPC signal is not transmitted with the DPCCH gating. Thus, it can be avoided that the transmission power of the downstream DPCCH is drawn toward the reference power value of the power balancing, and resultantly becomes a power value too lower or too higher than the power necessary for satisfying the target quality. That is, the power value controlled based upon the channel quality can be maintained, and the power control such that the required SIR is satisfied is enabled in the mobile station. As a result, futile interference and deterioration in the dedicated channel quality in the mobile station can be reduced, and a system throughput as well as a user throughput can be improved.

Further, this example makes the base station control easy because there is no necessity for setting the parameter responding to whether or not the mobile station is in the intermittent transmission mode.

Further, this example enables the overhead of the uplink to be alleviated because there is no necessity for a signal for notifying whether or not the mobile station is in the intermittent transmission mode.

Further, in this example, there is no erroneous operation caused by a detection error because there is no necessity for detecting whether or not the mobile station is in the intermittent transmission mode in a blind manner.

EXAMPLE 6

An example 6 will be explained. The example 6 is an example of, in the downstream power control, performing the power balancing only when executing a TPC command.

FIG. 14 is a configuration view of the base station of the example 6. Additionally, an identical code is affixed to a component of the base station similar to that of the foregoing example.

A basic configuration of the base station is identical to that of the foregoing example 1, and an SIR measurement section 601 measures the SIR of the TPC signal (or the pilot signal) of each slot, and notifies its result to a transmission power control section 602. For example, when the SIR has deteriorated at a level of a value equal to or less than a reliability degree threshold, the SIR measurement section 601 notifies its effect to the transmission power control section 602.

When the SIR has not deteriorated at a level of a value equal to or less than a reliability degree threshold, the transmission power control section 602 performs the normal power balancing. That is, it performs the transmission power control based upon an equation 1 and an equation 2.

$$P(k)=P(k-1)+P\_TPC(k)+P\_bal(k) \quad \text{Equation 1}$$

$$\text{Sum } P\_bal=(1-r)*(P\_ref+P\_CPICH-P\_init) \quad \text{Equation 2}$$

On the other hand, when the SIR has deteriorated at a level of a value equal to or less than a reliability degree threshold, the transmission power control section 602 does not reflect the adjustment value (P_bal) by the TCP signal and the power balancing into the transmission power. That is, it does not perform the transmission power control.

This example makes it possible to stop or to gradually perform the power adjustment as well for the power balancing in a case where the high speed power control cannot be performed based upon a channel quality because the TPC signal is not transmitted with the DPCCH gating. Thus, it can be avoided that the transmission power of the downstream DPCCH is drawn toward the reference power value of the power balancing, and resultantly becomes a power value too lower or too higher than the power necessary for satisfying the target quality. That is, the power value controlled based upon the channel quality can be maintained, and the power control such that the required SIR is satisfied is enabled in the mobile station. As a result, futile interference and deterioration in the dedicated channel quality in the mobile station can be reduced, and a system throughput as well as a user throughput can be improved.

Further, in this example, an effect of the power balancing can be enhanced because the control being taken in this example is almost identical to the control in the case of applying the normal parameter when the mobile station is in the normal mode.

Further, this example makes the base station control easy because there is no necessity for detecting whether or not the mobile station is in the intermittent transmission mode.

As mentioned above, it was shown in the examples that the power control method in the system for performing the balance adjustment of the transmission powers of a plurality of the base stations in accordance with the present invention was a method of changing a ratio (adjustment speed) of the transmission power approaching a reference power of the power balancing between such a communication in which the signal was transmitted in all slots like the case of the normal mode, and such a communication having the slot for not transmitting the signal like the case of the intermittent transmission mode.

Further, it was shown in the examples that the power control method in such a system for performing the balance adjustment of the transmission powers of a plurality of the base stations in accordance with the present invention includes two adjustment methods, i.e. the first balance adjustment method in the case of having the slot in which the control signal for these base stations was not transmitted, and the second balance adjustment method in the case of having no slot in which the control signal was not transmitted.

However, the power control method in such a system for performing the balance adjustment of the transmission powers of a plurality of the base stations in accordance with the present invention is not limited to these.

Further, the present invention premised an execution of the power balancing for the downlink in the previous description; however the present invention, which is not always restrained by a direction of the channel and a role of the stations such as the base station and the mobile station, is applicable to the case as well of performing the power balancing of the transmission power from at least one transmission station, in general, two or more to the reception station.

Further, the previous description was made on the assumption that the base station controller notified the reference power offset value P_ref being decided by the base station controller, being a parameter that was employed for the transmission power control, the power value P_CPICH of the common pilot signal being transmitted by the base station, r, etc., as well as R_gating, r_gating, or f_gating to the base station; however the present invention is not limited to the method in which the base station controller notifies these parameters, and for example, the method of separately establishing these parameters to the base station, the method of deciding these parameters base station by base station, or the like is acceptable.

The invention claimed is:

1. A transmission power control method of a base station in a communication system including at least a mobile station and at least one base station, characterized in changing a ratio of a transmission power approaching a predetermined reference power between a communication having a slot for not transmitting a signal and a communication having no slot for not transmitting a signal.

2. A transmission power control method according to claim 1, characterized in that:
said transmission power control method is a transmission power control method including power balancing for updating the transmission power of the base station having established a channel with said mobile station based upon a predetermined reference power; and
said predetermined reference power is comprised of a reference power offset value being decided by a base station controller, and a power value of a common pilot signal being transmitted by the base station.

3. A transmission power control method according to claim 1 or claim 2, characterized in making a ratio of approaching said predetermined reference power in a communication having a slot for stopping a transmission of the signal lower than a ratio of approaching said predetermined reference power in a communication having no slot for stopping a transmission of the signal.

4. A transmission power control method according to one of claim 1 or claim 2, characterized in that:
said communication having a slot for stopping a transmission of the signal is a communication in the case that the mobile station is intermittently transmitting a control signal; and
said communication having no slot for stopping a transmission of the signal is a communication in the case that the mobile station is consecutively transmitting a control signal.

5. A transmission power control method in such a system for performing a balance adjustment of transmission powers of a plurality of base stations, characterized in including two adjustment methods, i.e. a first balance adjustment method in the case of having a slot in which a control signal for the base station is not transmitted, and a second balance adjustment method in the case of having no slot in which a control signal is not transmitted.

6. A communication system including at least a mobile station and at least one base station, characterized in comprising a transmission power controlling means for changing a ratio of a transmission power approaching a predetermined reference power between a communication having a slot for not transmitting a signal and a communication having no slot for not transmitting a signal.

7. A communication system according to claim 6, characterized in that:
said transmission power controlling means performs power balancing for updating the transmission power of the base station having established a channel with said mobile station based upon a predetermined reference power; and
said predetermined reference power is comprised of a reference power offset value being decided by a base station controller, and a power value of a common pilot signal being transmitted by the base station.

8. A communication system according to claim 6 or claim 7, characterized in that said transmission power controlling means makes a ratio of approaching said predetermined reference power in a communication having a slot for stopping a transmission of the signal lower than a ratio of approaching said predetermined reference power in a communication having no slot for stopping a transmission of the signal.

9. A communication system according to one of claim 6 to claim 7, characterized in that:
said communication having a slot for stopping a transmission of the signal is a communication in the case that the mobile station is intermittently transmitting a control signal; and
said communication having no slot for stopping a transmission of the signal is a communication in the case that the mobile station is consecutively transmitting a control signal.

10. A communication system for performing a balance adjustment of transmission powers of a plurality of base stations, characterized in comprising a means for performing the balance adjustment of the transmission power by employing any of two adjustment methods, i.e. a first balance adjustment method in the case of having a slot in which a control signal for the base station is not transmitted, and a second balance adjustment method in the case of having no slot in which a control signal is not transmitted.

11. A base station in a communication system including at least a mobile station and at least one base station, characterized in comprising a transmission power controlling means for changing a ratio of a transmission power approaching a predetermined reference power between a communication having a slot for not transmitting a signal and a communication having no slot for not transmitting a signal.

12. A base station according to claim 11, characterized in that:
said transmission power controlling means performs power balancing for updating the transmission power of the base station having established a channel with said mobile station based upon a predetermined reference power; and
said predetermined reference power is comprised of a reference power offset value being decided by a base station controller, and a power value of a common pilot signal being transmitted by the base station.

13. A base station according to claim 11 or claim 12, characterized in that said transmission power controlling means makes a ratio of approaching said predetermined reference power in a communication having a slot for stopping a transmission of the signal lower than a ratio of approaching said predetermined reference power in a communication having no slot for stopping a transmission of the signal.

14. A base station according to one of claim 11 or claim 12, characterized in that:
said communication having a slot for stopping a transmission of the signal is a communication in the case that the mobile station is intermittently transmitting a control signal; and
said communication having no slot for stopping a transmission of the signal is a communication in the case that the mobile station is consecutively transmitting a control signal.

15. A base station in a communication system for performing a balance adjustment of transmission powers of a plurality of base stations, characterized in comprising a means for performing the balance adjustment of the transmission power by employing any of two adjustment methods, i.e. a first balance adjustment method in the case of having a slot in which a control signal for the base station is not transmitted, and a second balance adjustment method in the case of having no slot in which a control signal is not transmitted.

16. A base station controller in a communication system including at least a mobile station and at least one base station, characterized in comprising a means for transmitting a parameter of a transmission power control in a communication having a slot for not transmitting a signal, and a parameter of a transmission power control in a communication having no slot for not transmitting a signal to the base station.

17. A base station controller in a communication system including at least a mobile station and at least one base station, characterized in comprising a means for transmitting any of a parameter of a transmission power control in a communication having a slot for not transmitting a signal, and a parameter of a transmission power control in a communication having no slot for not transmitting a signal to the base station.

18. A program for a base station in a communication system including at least a mobile station and at least one base station, characterized in causing said base station to execute a process of changing a ratio of a transmission power approaching a predetermined reference power between a communication having a slot for not transmitting a signal and a communication having no slot for not transmitting a signal.

19. A program for a base station in a communication system for performing a balance adjustment of transmission powers of a plurality of the base stations, characterized in causing said base station to execute a process of performing the balance adjustment of the transmission power by employing any of two adjustment methods, i.e. a first balance adjustment method in the case of having a slot in which a control signal for the base station is not transmitted, and a second balance adjustment method in the case of having no slot in which a control signal is not transmitted.

\* \* \* \* \*

UNITED STATES PATENT AND TRADEMARK OFFICE
CERTIFICATE OF CORRECTION

PATENT NO. : 8,135,429 B2  
APPLICATION NO. : 12/293232  
DATED : March 13, 2012  
INVENTOR(S) : Nahoko Kuroda et al.

Page 1 of 1

It is certified that error appears in the above-identified patent and that said Letters Patent is hereby corrected as shown below:

Title page, Column 2, Line 6: delete "lub" and insert -- Iub --

In the Specification:

Column 29, Line 28: delete "P_bal(k)=f_gating" and insert -- P_bal=f_gating --

Signed and Sealed this  
Sixth Day of August, 2013

Teresa Stanek Rea  
*Acting Director of the United States Patent and Trademark Office*